United States Patent [19]

Yano

[11] Patent Number: 5,675,527

[45] Date of Patent: Oct. 7, 1997

[54] MULTIPLICATION DEVICE AND SUM OF PRODUCTS CALCULATION DEVICE

[75] Inventor: Naoka Yano, Tokyo, Japan

[73] Assignee: Kabushiki Kaisha Toshiba, Kawasaki, Japan

[21] Appl. No.: 599,966

[22] Filed: Feb. 14, 1996

[30] Foreign Application Priority Data

Feb. 14, 1995 [JP] Japan .................................. 7-025039

[51] Int. Cl.$^6$ .................................. G06F 7/52; G06F 7/00
[52] U.S. Cl. .................... 364/760; 364/759; 364/750.5
[58] Field of Search .............................. 364/750.5, 754, 364/757, 759, 760

[56] References Cited

U.S. PATENT DOCUMENTS 4,811,269  3/1989  Hirose et al. ........................ 364/759

OTHER PUBLICATIONS

IBM Tech. Discl. vol. 23, No. 9 Feb. 1981, pp. 4322–4323, Chevillat et al. "Pipelined Hardware Multiplier with Extended Precision".
Nagamatsu et al., "A 150MIPS/W CMOS RISC Processor for PDA Applications", *Session Digital Design Elements*, pp. 114–115, (1995).

Primary Examiner—Tan V. Mai
Attorney, Agent, or Firm—Foley & Lardner

[57] ABSTRACT

In the first half of one cycle of a clock, a partial product generation circuit of each stage in a multiplication array generates partial products on the basis of one bit of the 16 low-order bits of multiplier data and the bits of multiplicand data. An accumulative addition circuit of each stage in the multiplication array accumulatively adds an initial value or an output from a previous accumulative addition circuit to the partial products to perform half necessary multiplication, writes the accumulative result in a latch as intermediate result data, and writes the predetermined number of bits of an output from the accumulative addition circuit of each stage at a predetermined bit position of the latch. In the second half of the clock, the partial product generation circuit of each stage generates partial products on the basis of one bit of an output from a latch holding the 16 high-order bits of a multiplier and the bits of the multiplicand data. In addition, the accumulative addition circuit of each stage accumulatively adds the intermediate result data or an output from a previous accumulative addition circuit to the partial products to perform the remaining half the calculation, and writes the final accumulative addition result and the predetermined number of bits of the output from the accumulative addition circuit of each stage in a latch.

18 Claims, 17 Drawing Sheets

FIG.2
PRIOR ART

| ABC | Z | C0 |
|-----|---|----|
| 000 | 0 | 0  |
| 001 | 1 | 0  |
| 010 | 1 | 0  |
| 011 | 0 | 1  |
| 100 | 1 | 0  |
| 101 | 0 | 1  |
| 110 | 0 | 1  |
| 111 | 1 | 1  |

MULTIPLICATION DEVICE AND SUM OF PRODUCTS CALCULATION DEVICE

BACKGROUND OF THE INVENTION

1. Field of the Invention

The present invention relates to a multiplication device and a sum of products calculation device which are used as calculation devices such as a data processor and a microprocessor.

2. Prior Art

As a technique in the field of this type, the technique shown in FIGS. 1 to 4 is available.

FIG. 1 is a view showing the arrangement of a conventional multiplication device using a carry save adder scheme.

This multiplication device has a function of performing multiplication of 8 bits×8 bits. More specifically, multiplication between 8-bit multiplicand data X<0:7> and 8-bit multiplier data Y<0:7> is performed, thereby outputting a multiplication result OUT<0:15>.

As shown in FIG. 1, this multiplication device is constituted by an 8-bit multiplicand register 101 for holding a multiplicand X, an 8-bit multiplier register 102 for holding a multiplier Y, and a multiplication unit 103.

The multiplication unit 103 is constituted by eight multiplication arrays 104 and a carry look ahead adder 105 connected to the last multiplication array. Each of the multiplication arrays 104 comprises a partial product generation circuit constituted by eight AND gates 104a for generating partial products and an accumulative addition circuit constituted by eight full adders 104b for accumulatively adding the generated partial products.

In this case, the truth table of outputs Z and CO with respect to inputs A, B, and C of each full adder 104b is shown in FIG. 2.

The operation of this multiplication device will be described below.

In the first multiplication array 104, a logical AND between an output X<0:7> from the multiplicand register 101 and an output Y<7> from the multiplier register 102 is calculated, and an output from the first multiplication array 104 is added to the second multiplication array 104. In the second multiplication array 104, partial products are accumulatively added by using the output from the first multiplication array 104, the output X<0:7> from the multiplicand register 101 and the output Y<6> from the multiplier register 102.

Similarly, accumulative additions are sequentially performed by the third to eighth multiplication arrays 104. Finally, the carry look ahead adder 105 performs a carry look ahead addition to an output from the eighth multiplication array. As a result, outputs from the carry look ahead adder 105 are generated as multiplication results OUT<0:7>, and outputs from the full adders 104b located at the least significant bits of the first to eighth multiplication arrays are generated as multiplication results OUT<9:15>.

FIG. 3 is a view showing the arrangement of a conventional sum of products calculation device using a carry save adder scheme.

This sum of products calculation device has a function of performing sum of products calculation of 8 bits×8 bits+16 bits. That is, the product between 8-bit multiplicand data X<7:0> and 8-bit multiplier data Y<7:0> is calculated, and a 16-bit addition is performed, thereby outputting sum of products results OUT<15:0>.

This sum of products calculation device comprises, as shown in FIG. 3, an 8-bit multiplicand register 111 for holding the multiplicand X, an 8-bit multiplier register 112 for holding the multiplier Y, and a multiplication unit 113.

The multiplication unit 113 is constituted by eight multiplication arrays 114 to which the output sides of a multiplicand register 111 and a multiplier register 112 are connected, a multiplication result registers 115, 118 connected to the last multiplication array 114, and a carry look ahead adder (adder with CLA) 116.

Each of the multiplication arrays 114 comprises a partial product generation circuit constituted by eight multiplication arrays 114a for generating partial products and an accumulative addition circuit constituted by eight full adders 114b for accumulatively adding the generated partial products. In addition, the multiplication result register 115 is a 16-bit register for holding an accumulative addition result set in a carry save form (state divided into carry and sum states). The multiplication result register 118 is a register for holding the OUT<6:0> from the full adders 104b located at the least significant bits of the first to eighth multiplication arrays. The carry look ahead adder 116 is a carry look ahead adder (8 bits+8 bits) for returning the carry save from of the accumulative addition result to a general form.

A carry look ahead adder 117 (16 bits+16 bits) for adding the multiplication result to sum of products data is connected to the output of the multiplication device 113.

According to the sum of products calculation device arranged as described above, the first multiplication array 114 generates partial products on the basis of all bits of the multiplicand and the least significant bit <0> of the multiplier, the second multiplication array 114 generates partial products on the basis of the second bit<1> from the least significant bit of the multiplier and all bits of the multiplicand, and the accumulative addition between the partial products generated by the second multiplication array 114 and the partial products generated by the first multiplication array 114 is performed. Similarly, generation of partial products and an accumulative addition are repeated in the third to eighth multiplication arrays 114, the multiplication results between the multiplicands and the multipliers are obtained in a carry save form (the same operation as that of the multiplication device shown in FIG. 1).

After the multiplication results are temporarily stored in the multiplication result registers 115, 118, the multiplication results are added to each other by the carry look ahead adder 116, thereby obtaining a 16-bit multiplication result. Thereafter, the carry look ahead adder 117 performs addition for the multiplication result again to add sum of products data <15:0> to the multiplication result, thereby obtaining a sum of products calculation result OUT<15:0>.

FIG. 4 is a view showing the arrangement of a conventional multiplication device using a repeat addition scheme.

The multiplication device has a function of performing multiplication of 32 bits×32 bits. That is, multiplication between 32-bit multiplicand data X<0:31> and 32-bit multiplier data Y<0:31> is performed.

As shown in FIG. 4, this multiplication device comprises a 32-bit multiplicand register 121 for holding multiplicand data X, a 32-bit multiplier register 122 for holding multiplier data Y, a 32-bit register 123 for holding an accumulative addition result obtained in the middle of multiplication, a 32-bit adder 124 for adding the contents of the multiplicand register 121 to the contents of the register 123, and a selector 125 for selecting and outputting an output ADD<0:31> from the adder 124 when a least significant bit Y<31> of the multiplier register 122 is "1", and selecting and outputting an output Z<0:31> from the register 123 when the least significant bit Y<31> is "0". Note that the multiplication result is finally stored in the multiplier register 122.

An output SEL<0:30> from the selector 125 is written in Z<1:31> of the register 123 the moment a carry output CARRY from the adder 124 is written in a most significant bit Z<0> of the register 123, a least significant bit SEL<31> of an output from the selector 125 is written in a most significant bit Y<0> of the multiplier register 122, and Y<0:30> of the multiplier register 122 is written in Y<1:31> of the multiplier register 122. The above series of processes are repeated 32 times.

More specifically, as one process unit, a process in which, according to a value Y<i> (i=0 to 31) of each digit of the multiplier Y, the multiplicand X<0:31> is added to the register 123 for holding the accumulative addition result while the multiplicand X<0:31> is shifted right by one bit (when Y<i>=1) or the contents of the register 123 are only shifted right by one bit without adding the multiplicand X<0:31>(when Y<i>=0); and a process in which the ith bit from the most significant bit of the multiplication result fixed in the ith process is stored in the most significant bit of the multiplier register 122 while the multiplier register 122 is shifted right by one bit are performed. When this process unit is repeated 32 times (i=0 to 31), the low-order 32 bits of the multiplication result are stored in the multiplier register 122, and the upper 32 bits are stored in the register 123.

However, in the prior art, the following problems are posed.

(1) Since calculation is performed in units of clocks, all hardware required for one clock must be equipped, and a circuit area disadvantageously increases. That is, in the examples shown in FIGS. 1 and 3, partial product generation circuits and accumulative addition circuits which are used to calculate partial products are required. For this reason, in calculation of 32 bits×32 its, 32×32=1,024 full adders and 32×32=1,024 partial product generation circuits are required, thereby disadvantageously increase a circuit formation area.

(2) In the example in FIG. 4, the number of required parts is considerably smaller than that in the example shown in FIG. 1. However, addition is repeated times number of which is equal to the number of bits of multiplication. For this reason, as a bit width increases, a calculation time becomes enormous, and high-performance calculation cannot be performed.

SUMMARY OF THE INVENTION

The present invention has been made in consideration of the above circumstances, and has as its object to a multiplication device and a sum of products calculation device in which an amount of hardware is reduced without increasing a calculation process time.

It is another object of the present invention to provide a multiplication device and a sum of products calculation device capable of reducing a circuit area.

In order to achieve the above object, the present invention provides a multiplication device, comprising: a multiplicand holding circuit for holding multiplicand data; a multiplier holding circuit for holding the predetermined number of bits from high-order bits of multiplier data; a first selector for switching the predetermined number of bits from low-order bits of multiplier data to an output from said multiplier holding circuit according to turning from the first or second half of a clock to the second or first half of the clock; an intermediate result holding circuit for holding intermediate result data; a second selector for switching an initial value to an output from said intermediate result holding circuit according to turning from the first or second half of the clock to the second or first half of the clock; a plurality of partial product generation circuits for generating partial products on the basis of an output from said first selector and an output from said multiplicand holding circuit; a plurality of accumulative addition circuits for performing accumulative addition on the basis of an output from said second selector or an output from a previous accumulative addition circuit and outputs from said partial product generation circuits to generate the intermediate result data serving as an intermediate result of multiplication; an accumulative addition result holding circuit for holding an output from the predetermined number of said accumulative addition circuits and some of outputs from said accumulative addition circuits; and an output holding circuit for storing some of the outputs from said accumulative addition circuits, characterized in that, at a first timing which is the first or second half of the clock, said first selector selects the predetermined number of bits from the low-order bits of the multiplier data, said second selector selects the initial value, each partial product generation circuit generates partial products on the basis of one bit of an output from said first selector and an output from each bit of said multiplicand holding circuit, each accumulative addition circuit adds an output from said second selector or an output from a previous accumulative addition circuit to an output from said partial product generation circuit, writes an output from the predetermined number of said accumulative addition circuits in said intermediate result holding circuit as the intermediate result data, and writes the predetermined number of bits of the output from each accumulative addition circuit at a predetermined bit position of said output holding circuit;

at a second timing which is the second or first half of a clock after the clock switches, said first selector selects an output from said multiplier holding circuit, said second selector selects an output from said intermediate result holding circuit, each partial product generation circuit generates partial products on the basis of one bit of the output from said first selector and an output from each bit of said multiplicand holding circuit, each accumulative addition circuit adds an output from said second selector or an output from a previous accumulative addition circuit to an output from said partial product generation circuit, and writes the output from said predetermined accumulative addition circuit and the predetermined number of bits of the output from each accumulative addition circuit in said accumulative addition result holding circuit.

More specifically, according to the multiplication device of this invention, at the first timing which is the first or second half of the clock, each partial product generation circuit generates partial products on the basis of one bit of the low-order bits of the multiplier data and bits of the multiplicand data, each accumulative addition circuit accumulatively adds the initial value or an output from the previous accumulative addition circuit to the partial products to perform calculation which is half necessary multiplication, writes the accumulation result in the intermediate result holding circuit as intermediate result data, and writes the predetermined number of bits of an output from each accumulative addition circuit at a predetermined bit position of the output holding circuit. At the second timing at which the clock is switched to another one, each partial product generation circuit generates partial products on the basis of one bit of an output from the multiplier holding circuit and bits of the multiplicand data, each accumulative addition circuit accumulatively adds the intermediate result data or an output from the previous accumulative addition circuit to the partial products to perform the remaining half the calculation, and writes the accumulative addition result from said predetermined accumulation addition circuit and the predetermined number of bits of an output from each accumulative addition circuit in the accumulative addition result holding circuit.

Therefore, according to the multiplication device of this invention, a multiplication device having a small circuit scale and a calculation time which does not increase can be realized. In addition, since the multiplication device is operated in units of half clocks such as the first and second half clocks, the multiplication device is easily synchronized with an external device, and is suitably used in a precharge type adder.

In order to achieve the above object, the present invention provides a sum of products calculation device in which a carry propagation adder is connected to the output side of said accumulative addition result holding circuit in said multiplication device through a carry save adder, characterized in that, at a third timing which is the first or second half of a clock and succeeds the second timing after the clock switches, an output from said accumulative addition result holding circuit and addition data are added to each other by said carry save adder, and the addition results in a carry save state are added to each other by said carry propagation adder to output a sum of products calculation result.

Therefore, according to the sum of products calculation device of this invention, a multiplication result in a carry save state of the multiplication device is temporarily added to the sum of products data by the carry save adder, and the results still in a carry state are further added to each other by the carry propagation adder. For this reason, a time required for addition in sum of products calculation can be shortened.

In order to achieve the above object, the present invention provides a multiplication device, comprising: a multiplicand holding circuit for holding multiplicand data; a multiplier holding circuit for holding the predetermined number of bits from high-order bits of multiplier data; a first selector for switching the predetermined number of bits from low-order bits of multiplier data to an output from said multiplier holding circuit according to turning from the first or second half of a clock to the second or first half of the clock; an encode circuit for encoding an output from said first selector; an intermediate result holding circuit for holding intermediate result data; a second selector for switching an initial value to an output from said intermediate result holding circuit according to turning from the first or second half of the clock to the second or first half of the clock; a plurality of partial product generation circuits for generating partial products on the basis of an output from said encode circuit and an output from said multiplicand holding circuit; a plurality of accumulative addition circuits for performing accumulative addition on the basis of an output from said second selector or an output from a previous accumulative addition circuit and outputs from said partial product generation circuits to generate the intermediate result data serving as an intermediate result of multiplication; an accumulative addition result holding circuit for holding an output from the predetermined number of said accumulative addition circuits and some of outputs from said accumulative addition circuits; and an output holding circuit for storing some of the outputs from said accumulative addition circuits, characterized in that, at a first timing which is the first or second half of the clock, said firsts selector selects the predetermined number of bits from the low-order bits of the multiplier data, said second selector selects the initial value, each partial product generation circuit generates partial products on the basis of an encode result of said encode circuit and an output from said multiplicand holding circuit, each accumulative addition circuit adds an output from said second selector or an output from a previous accumulative addition circuit to an output from said partial product Generation circuit, writes an output from the predetermined number of said accumulative addition circuits in said intermediate result holding circuit as the intermediate result data, and writes the predetermined number of bits of the output from each accumulative addition circuit at a predetermined bit position of said output holding circuit;

at a second timing which is the second or first half of a clock after the clock switches, said first selector selects an output from said multiplier holding circuit, said second selector selects an output from said intermediate result holding circuit, each partial product generation circuit generates partial products on the basis of an output from said encode circuit and an output from said multiplicand holding circuit, each accumulative addition circuit adds an output from said second selector or an output from a previous accumulative addition circuit to an output from said partial product generation circuit, and writes the output from said predetermined accumulative addition circuit and the predetermined number of bits of the output from each accumulative addition circuit in said accumulative addition result holding circuit.

More specifically, according to the multiplication device of this invention, at the first timing which is the first or second half of the clock, each partial product generation circuit generates partial products on the basis of an encode result from the encode circuit obtained by encoding the predetermined number of bits from the low-order bits of the multiplier data and an output from a multiplicand holding circuit, each accumulative addition circuit accumulatively adds the initial value or an output from the previous accumulative addition circuit to the partial products to perform calculation which is half necessary multiplication, writes the accumulation result from said predetermined accumulative addition circuit in the intermediate result holding circuit as intermediate result data, and writes the predetermined number of bits of an output from each accumulative addition circuit at a predetermined bit position of the output holding circuit. At the second timing at which the clock is switched to another one, each partial product generation circuit generates partial products on the basis of an output from said encode circuit and an output from the multiplicand holding circuit, each accumulative addition circuit accumulatively adds an output from the intermediate result holding circuit or an output from the previous accumulative addition circuit to an output from the parietal product generation circuit to perform the remaining half the calculation, and writes the accumulative addition result from the predetermined number of accumulation addition circuits and the predetermined number of bits of an output from each accumulative addition circuit in the accumulative addition result holding circuit. In this manner, when the encode circuit is constituted by, e.g., Booth's algorithm, the number of partial products generation circuits and the number of accumulative addition circuits can be made smaller than those in the embodiment described first. For this reason, a time required for an accumulative addition process can be shortened.

In order to achieve the above object, the present invention provides a sum of products calculation device in which a carry propagation adder is connected to the output sides of said accumulative addition result holding circuit and said output holding circuit in said multiplication device through a carry save adder, characterized in that, at a third timing which is the first or second half of a clock and succeeds the second timing after the clock switches, an output from said accumulative addition result holding circuit, an output from said output holding circuit, and addition data are added to each other by said carry save adder, and the addition results in a carry save state are added to each other by said carry propagation adder to output a sum of products calculation result.

Therefore, according to the sum of products calculation device of this invention, a multiplication result in a carry save state of the multiplier is temporarily added to the sum of products data by the carry save adder, and the results still in a carry save state are further added to each other by the carry propagation adder. For this reason, a time required for addition in sum of products calculation can be shortened.

According to a preferred embodiment of the present invention, said encode circuit performs the encode on the basis of Booth's algorithm.

According to a preferred embodiment of the present invention, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

According to this embodiment, a time loss and a hardware loss can be suppressed.

According to a preferred embodiment of the present invention, the sum of products calculation device further comprises:

a sign holding circuit for holding a sign of a partial product in a predetermined stage;

in said first accumulative addition circuit, another full adder for sign extension and two selectors for selectively outputting an input signal depending on said first timing or the second timing to use two high-order bits of said accumulative addition circuit for sign extension, said two selectors corresponding to the two bits, respectively; and in said second accumulative addition circuit, two selectors for selectively outputting an input signal depending on the first timing or the second timing to the two high-order bits of said accumulative addition circuit for sign extension, said two selectors corresponding to the two bits, respectively.

According to this embodiment, sign extension can be reliably performed.

In order to achieve the above object, the present invention provides a multiplication device, comprising: a multiplicand holding circuit for holding multiplicand data; a multiplier holding circuit for holding the predetermined number of bits from high-order bits of multiplier data; a first selector for switching the predetermined number of bits from low-order bits of multiplier data to an output from said multiplier holding circuit according to turning from the first or second half of a clock to the second or first half of the clock; an encode circuit for encoding an output from said first selector; an encode result holding circuit for holding an encode result from said encode circuit each time a logical value of the clock changes to output the encode result; an intermediate result holding circuit for holding intermediate result data; a second selector for switching an initial value to an output from said intermediate result holding circuit according to turning from the first or second half of the clock to the second or first half of the clock; a plurality of partial product generation circuits for generating partial products on the basis of an output from said encode result holding circuit and an output from said multiple and holding circuit; a plurality of accumulative addition circuits for performing accumulative addition of the basis of an output from said second selector or an output from a previous accumulative addition circuit and outputs from said partial product generation circuits to generate the intermediate result data serving as an intermediate result of multiplication; an accumulative addition result holding circuit for holding an output from the predetermined number of said accumulative addition circuits and some of outputs from said accumulative addition circuits, and an output holding circuit for storing some of the outputs from said accumulative addition circuits, characterized in that, at a first timing Which is the first or second half of the clock, said first elector selects the predetermined number of bits from the low-order bits of the multiplier data, and said encode circuit encodes an output from said first selector to write the encode result in said encode result holding circuit, at a second timing which is the second or first half of a clock after the clock switches, said second selector selects the initial value, each partial product generation circuit generates partial products on the basis of an output from said encode result holding circuit and an output from said multiplicand holding circuit, each accumulative addition circuit adds an output from said second selector or an output from a previous accumulative addition circuit to an output from said partial product generation circuit, writes an output from the predetermined number of accumulative addition circuits in said intermediate result holding circuit as the intermediate result data, and writes the predetermined number of bits of the output from each accumulative addition circuit at a predetermined bit position of said output holding circuit, said first selector selects an output from said multiplier holding circuit, and said encode circuit encodes an output from said first selector to write the encode result in said encode result holding circuit;

at a third timing which is the second or first half of a clock and succeeds the second timing after the clock switches, said second selector selects an output from said intermediate result holding circuit, each partial product generation circuit generates partial products on the basis of an output from said encode result holding circuit and an output from said muitiplicand holding circuit, each accumulative addition circuit adds an output from said second selector or an output from a previous accumulative addition circuit to an output from said partial product generation circuit, and writes the output from said predetermined accumulative addition circuit and the predetermined number of bits of the output from each accumulative addition circuit in said accumulative addition result holding circuit.

More specifically, according to the multiplication device of this invention, at the first timing which is the first or second half of the clock, the encode circuit encodes the predetermined number of bits from low-order bits of the multiplier data to write the encode result in the encode result holding circuit. At the second timing at which the clock is switched to another one, each partial product generation circuit generates partial products on the basis of an output from the encode result holding circuit held at the first timing and an output from the multiplicand holding circuit, each accumulative addition circuit adds the initial value or an output from the previous accumulative addition circuit to an output from the partial product generation circuit to perform calculation which is half necessary multiplication, writes the intermediate result data in the intermediate result holding circuit, and writes the predetermined number of bits of an output from each accumulative addition circuit at a predetermined bit position of the output holding circuit, and the encode circuit encodes an output from the multiplier holding circuit to write the encode result in the encode result holding circuit. At the third timing at which the clock is switched to another one, each partial product generation circuit generates partial products on the basis of an output from the encode result holding circuit held at the second timing and an output from the multiplicand holding circuit, each accumulative addition circuit adds an output from the intermediate result holding circuit held at the second timing or an output from the previous accumulative addition circuit to an output from the partial product generation circuit to perform the remaining half the calculation, and writes an output from the predetermined number of accumulative addition circuits and the predetermined number of bits of an output from each accumulative addition circuit in the accumulative addition result holding circuit. In this manner, a half clock is assigned as a passing time of the encode circuit which is an overhead time in the multiplication device of the previous present invention, and an operation can be performed in units of half clocks. Although a calculation time is prolonged by a half cycle, times required to processes each performed in a half cycle are almost equal to each other. For this reason, a clock frequency for controlling a calculation device can be made high.

In order to achieve the above object, the present invention provides a sum of products calculation device in which a carry propagation adder is connected to the output sides of said accumulative addition result holding circuit and said output holding circuit in said multiplication device through a carry save adder, characterized in that, at a fourth timing which is the first or second half of a clock and succeeds the third timing after the clock switches, an output from said accumulative addition result holding circuit, an output from said output holding circuit, and addition data are added to each other by said carry save adder, and the addition results in a carry save state are added to each other by said carry propagation adder to output a sum of products calculation result.

Therefore, according to the sum of products calculation device of this invention, a multiplication result in a carry save state of the multiplier is temporarily added to the sum of products data by the carry save adder, and the results still in a carry save state are further added to each other by the carry propagation adder. For this reason, a time required for addition in sum of products calculation can be shortened.

According to a preferred embodiment of the present invention, said encode circuit performs the encode on the basis of Booth's algorithm.

According to a preferred embodiment of the present invention, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

According to this embodiment, a time loss and a hardware loss can be suppressed.

According to a preferred embodiment of the present invention, the sum of products calculation device further comprises:

a sign holding circuit for holding a sign of a partial product in a predetermined stage;

in said first accumulative addition circuit, another full adder for sign extension and two selectors for selectively outputting an input signal depending on said first timing or the second timing to use two high-order bits of said accumulative addition circuit for sign extension, said two selectors corresponding to the two bits, respectively; and in said second accumulative addition circuit, two selectors for selectively outputting an input signal depending on the first timing or the second timing to the two high-order bits of said accumulative addition circuit for sign extension, said two selectors corresponding to the two bits, respectively.

According to this embodiment, sign extension can be reliably performed.

The nature, principle and utility of the invention will become more apparent from the following detailed description when read in conjunction with the accompanying drawings.

BRIEF DESCRIPTION OF THE DRAWINGS

In the accompanying drawings:

FIGS. 2 is view showing truth table of a full adder;

DESCRIPTION OF THE PREFERRED EMBODIMENTS

Embodiments of the present invention will be described below with reference to the accompanying drawings.

Figure 5:
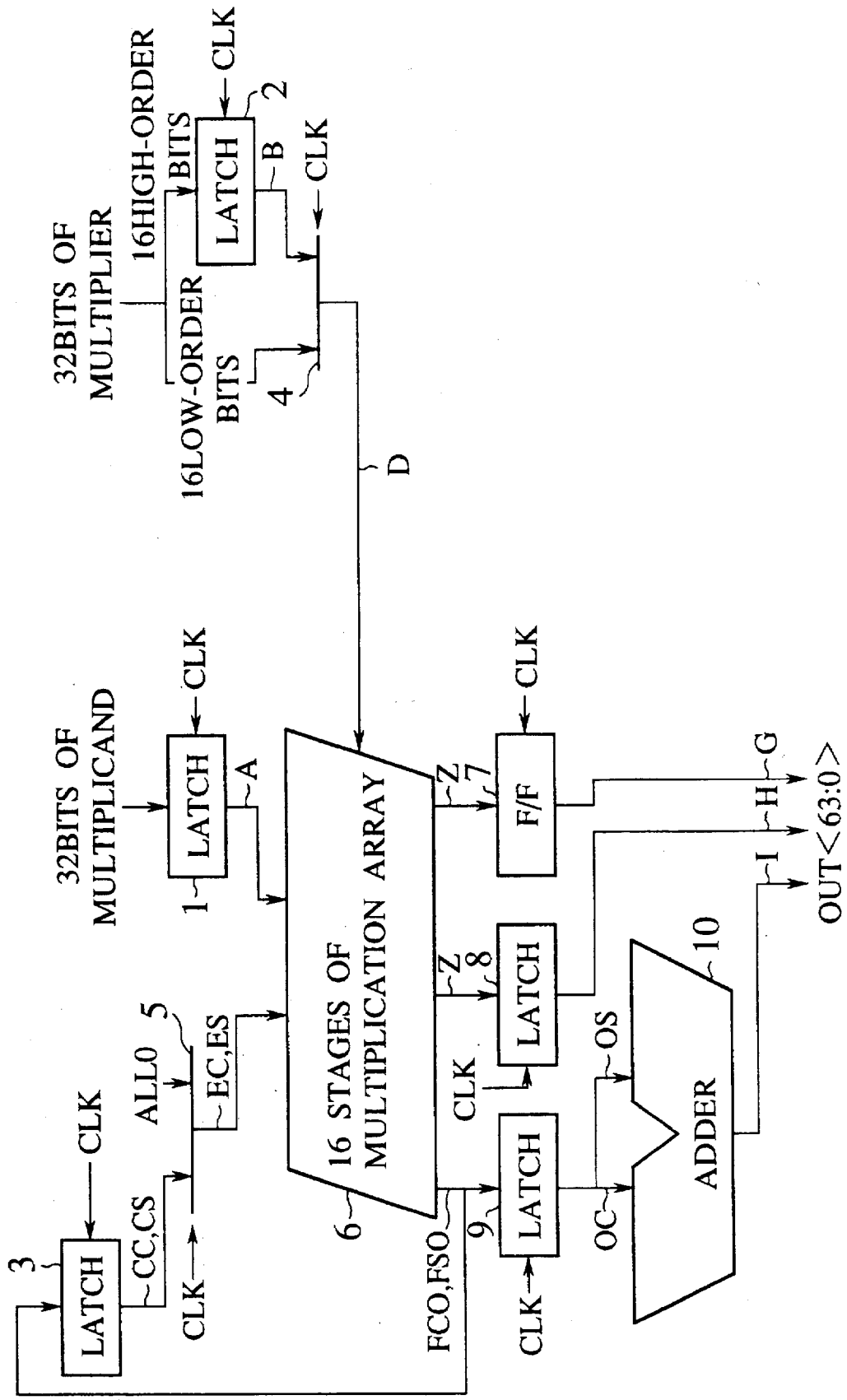
FIG. 5 is a view s owing the entire arrangement of a multiplication device according to the first embodiment of the present invention.

FIG. 5 is a view showing the entire arrangement of a multiplication device according to the first embodiment of the present invention.

This multiplication device has a function of performing multiplication of 32 bits×32 bits, and comprises a 32-bit latch circuit 1 through which the 32 bits of a multiplicand pass at "H" level of a clock and which holds the 32 bits of the multiplicand at "L" level of the clock, a 16-bit latch circuit 2 through which the 16 high-order bits of the 32 bits of a multiplier pass at "H" level of the clock and which holds the 16 high-order bits at "L" level of the clock, and a 63-bit latch circuit 3 through which intermediate result data (kept in a carry save form) output from the last stage of a multiplication array 6 (to be described later) passes at "H" level of the clock and which holds the intermediate result data at "L" level.

The multiplication device also comprises a first selector 4 for performing a switching operation between 16 low-order bits of a multiplier and an output from the latch circuit 2 at "H"/"L" level of the clock, and a second selector 5 for performing a switching operation between ALL0 data (initial value) in which all 63 bits are 0 data and an output from the latch circuit 3 at "H"/"L" level of the clock. The first and second selectors 4 and 5 and the output side of the latch circuit 1 are connected to 16-stage multiplication array 6.

Figure 1:
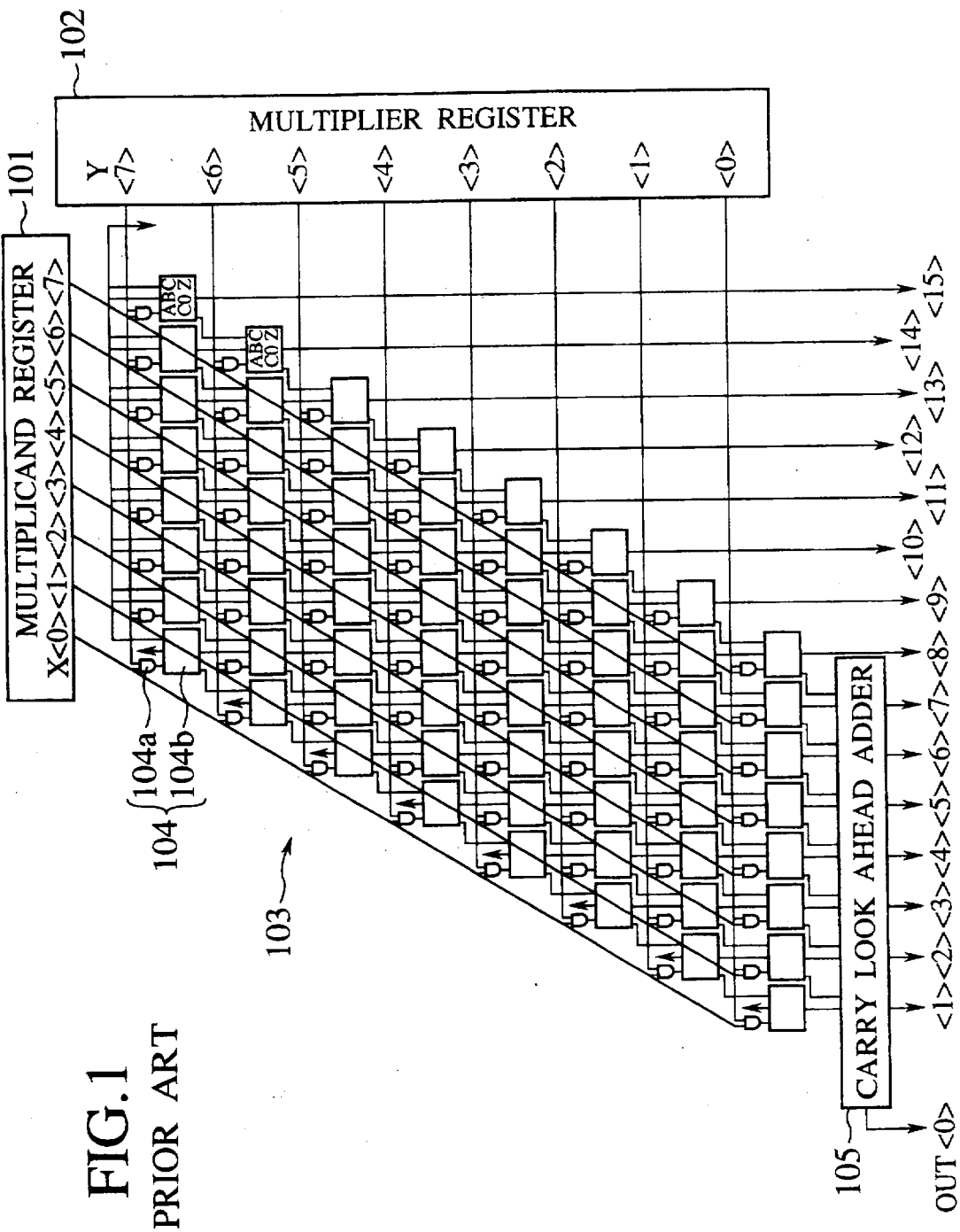
FIG. 1 is a view showing the arrangement of a conventional multiplication device using a carry save adder scheme.
Figure 3:
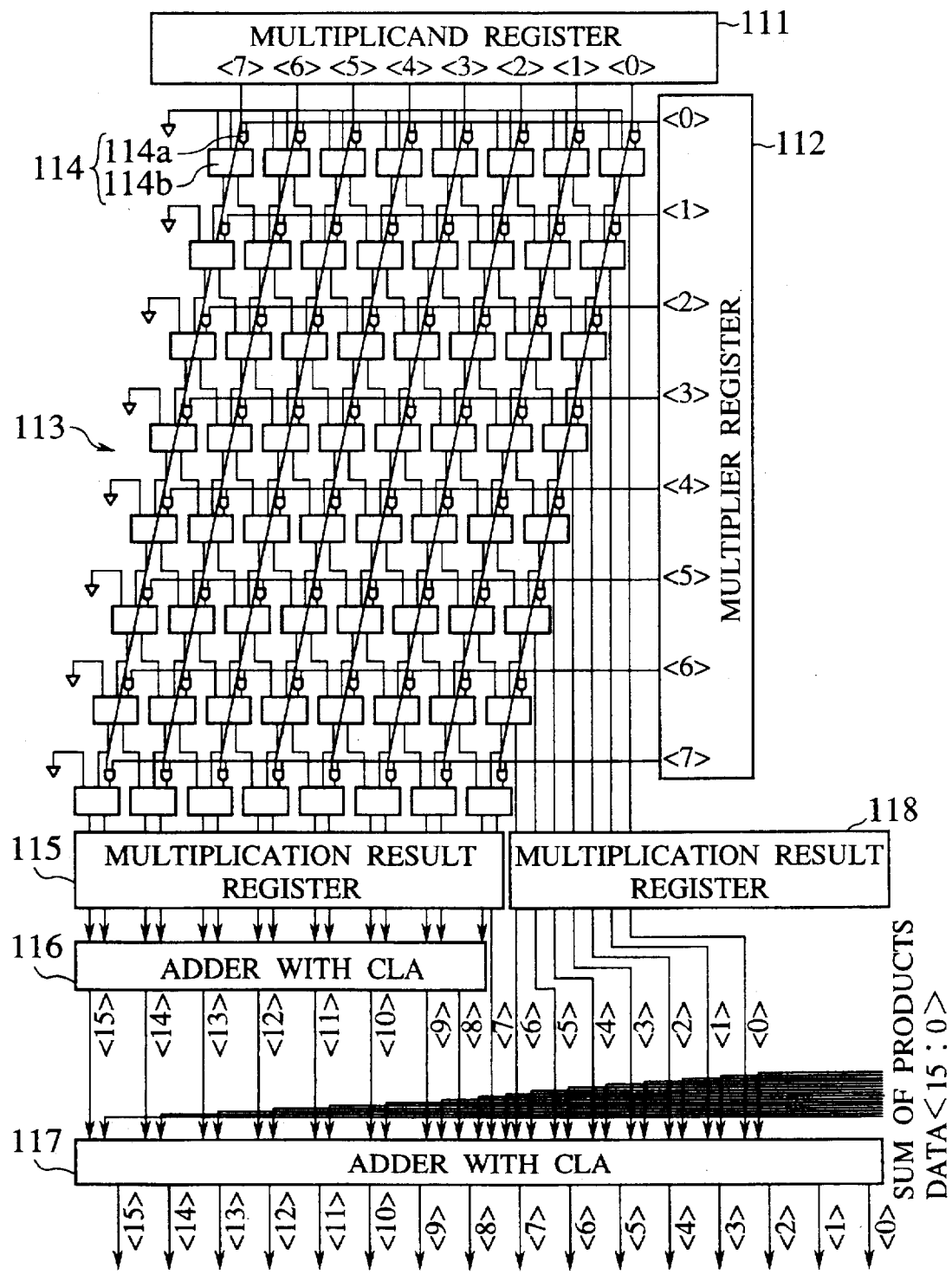
FIG. 3 is a view showing the arrangement of a conventional sum of products calculation device using a carry save adder scheme.
Figure 4:
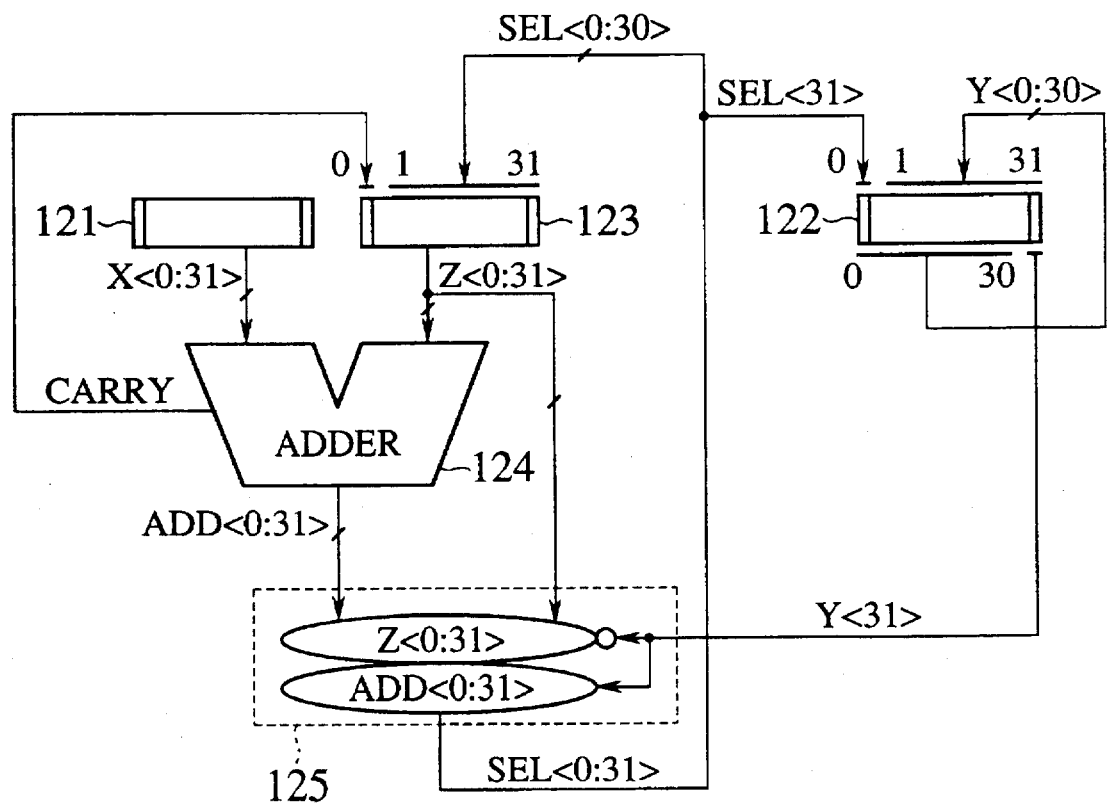
FIG. 4 is a view showing the arrangement of a conventional multiplication device using a repeat addition scheme.
Figure 6:
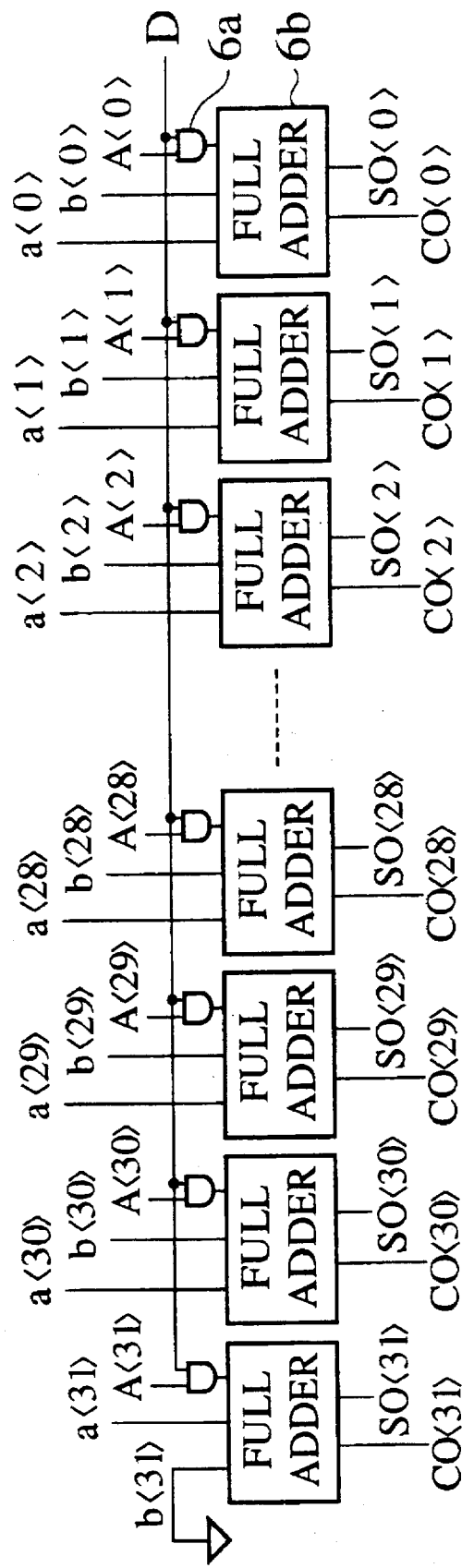
FIG. 6 is a view showing the arrangement of each multiplication array in the first embodiment.

Each stage of the multiplication array 6 comprises, as shown in FIG. 6, a partial product generation circuit 6a constituted by AND gates of 32 bits and an accumulative addition circuit 6b constituted by full adders of 32 bits. Sixteen circuits each having this arrangement are connected to each other in the same connection method as that shown in FIG. 1, thereby constituting the multiplication array 6.

In this case, outputs from the latch circuit 1 and the latch circuit 2 are set to be A<31:0> and B<15:0>, respectively. Of outputs (outputs from the accumulative addition circuits 6b) from the stages of the multiplication array 6, a carry output is set to be CO<31:0>, and a sum output is set to be SO<31:0>. In particular, a carry output CO<31:0> from the last stage of the multiplication array 6 Is set to be FCO<31:0>, a sum output SO<31:1> from the last stage is set to be FCO<30:0>, and a sum output from the least significant bit of each stage of the multiplication array 6 is set to be Z<15:0> (an output from the ith stage is set to be Z<i−1>).

The latch circuit 3 outputs CC<31:0> and CS<30:0> corresponding to the FCO<31:0> and FSO<30:0> which are intermediate result data output from the last stage of the multiplication array 6. In addition, the selector 4 outputs D<15:0>, and the second selector 5 outputs EC<31:0> corresponding to CC<31:0> or ALL0 data, and outputs ES<30:0> corresponding to CS<30:0> or ALL0 data.

A register (F/F) 7 and latch circuits 8 and 9 are connected to the output side of the multiplication array 6. The register 7 is a 16-bit register for storing, in synchronism with rising of the clock CLK, Z<15:0> output from the least significant bit of the accumulative addition circuit 6b of each stage of the multiplication array 6. Like the register 7, the latch circuit 8 is 16-bit latch circuit for holding Z<15:0>, and is set in a through state at "L" level of the clock CLK and in a hold state at "H" level of the clock CLK. The latch circuit 9 holds the outputs SO<30:0> and FCO<31:0> from the last stage of the multiplication array 6, and is set in a through state at "L" level of the clock CLK and in a hold state at "H" level of the clock CLK. An adder 10 for finally adding multiplication results in a carry save form to each other is connected to the output side of the latch circuit 9.

Note that an output from the register 7 is denoted by G<15:0>, and an output from the latch circuit 8 is denoted by H<15:0>. Of outputs from the latch circuit 9, an output corresponding to a carry output from the last stage of the multiplication array 6 is denoted by OC<31:0>, and an output corresponding to a sum output from the last stage of the multiplication array 6 is denoted by OS<30:0>. An output from the adder 10 is denoted by I<31:0>. An output from a multiplication device constituted by the outputs G<15:0>, H<15:0>, and I<31:0> is denoted by OUT<63:0>.

The arrangement and function of the multiplication array 6 will be described below.

As described above, each stage of the multiplication array 6 is constituted by the partial product generation circuit 6a and the accumulative addition circuit 6b. As shown in FIG. 6, input data a and b and an output from the AND gate constituting each bit of the partial product generation circuit 6a are supplied to the full adder constituting each bit of the accumulative addition circuit 6b. Note that b<31>=0 is established. Each of output A<31:0> from the latch circuit 1 is supplied to each of one input terminal of each AND gate of the partial product generation circuit 6a, one bit of output D<15:0> from the selector 4 is commonly supplied to each of the other input terminal of the AND gates of the partial product generation circuit 6a.

In this case, each the input data a and b has 32-bit width<31:0>. The output EC<31:0> from the selector 5 is supplied as input data a for the first stage, and the output ES<30:0> from the selector 5 is supplied as input data b for the first stage.

Each stage of the multiplication array 6 causes the partial product generation circuit 6a to generate partial products on the basis of all the bits of the output A<31:0> from the latch circuit 1 and one bit of the output D<15:0> from the selector 4, addition between the generated partial products and the input data a and b is performed by the accumulative addition circuit 6b, thereby generating a carry output CO<31:0> and a sum output SO<31:0>. Note that the truth table of each full adder constituting the accumulative addition circuit 6b is obtained such that the input data a and b and the output from the partial product generation circuit 6a are caused to correspond to the inputs A, B, and C of the truth table in FIG. 2, and the outputs CO and SO are caused to correspond to CO and Z of the truth table in FIG. 2.

The multiplication array 6 and its 16-stage connection will be described below. In the first stage of the multiplication array 6, input data b<31>=0 is satisfied, and the above operation is performed to obtain an addition result (D<0> of outputs from the selector 4 is supplied). A sum output SO<0> is externally output as Z<0>, the remaining sum output SO<31:1> is output as input data b<30:0> for the second stage, and the carry output CO<31:0> is output as input data a<31:0> for the second stage.

In the second stage of the multiplication array 6, the above operation is performed in the same manner as described above to obtain an addition result (D<1> of outputs from the selector 4 is supplied). A sum output SO<0> is externally output as Z<1>, the remaining sum output SO<31:1> is output as input data b<30:0> for the third stage, and the carry output CO<31:0> is output as input data a<31:0> for the third stage.

Assume that each of the stages following the third stage of the multiplication array 6 is the ith stage (i<16). In this case, the same operation as in the second stage is performed to obtain an addition result (D<i-1> of outputs from the selector 4 is supplied). A sum output SO<0> from the ith stage is externally output as Z<i-1>, the remaining sum output SO<31:1> is output as input data b<30:0> for the (i+1)th stage, and the carry output CO<31:0> is output as input data a<31:0> for the (i+1)th stage. The sum output SO<0> of outputs from the last stage (16th stage) is externally output as Z<15>, and the remaining sum output SO<31:1> and carry output CO<31:0> are externally output without any change.

The multiplication operation of the multiplication device of this embodiment arranged as described above will be described below with reference to FIG. 7.

(A) Operation in First Half 1 of Clock in E stage

Figure 7:
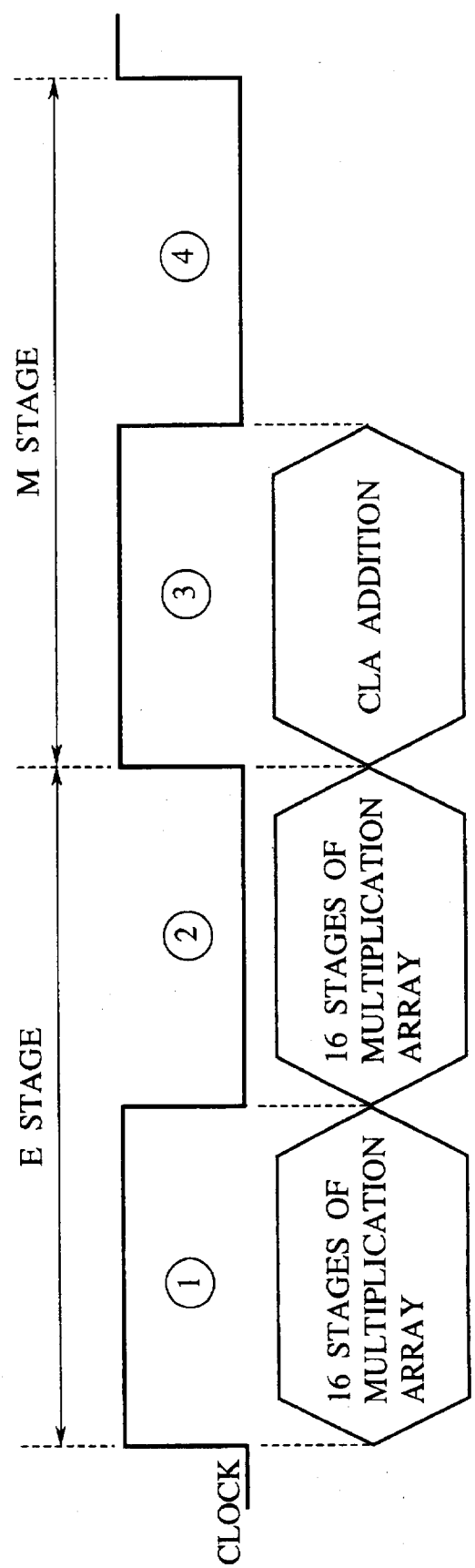
FIG. 7 is a view for explaining the multiplication operation of the multiplication device according to the first embodiment.

As shown in FIG. 7, in the first half 1 ("H" level) of the clock CLK in E stage, the moment a multiplicand is written in the latch circuit 1, the 16 high-order bits of a multiplier are written in the latch circuit 2. The selector 4 selects the 16 low-order bits of the multiplier. In this case, the 16 low-order bits of the multiplier are supplied to one input terminal of each AND gate of each of the 1st to 16th partial product generation circuits 6a of the multiplication array 6 as an output D<15:0> from the selector 4 in order from <0> to <15>.

At this time, the latch circuit 1 is in a through state. For this reason, the output A<31:0> serving as a multiplicand is supplied to the other input terminal of each AND gate of each partial product generation circuit 6a of the multiplication array 6. In this manner, each stage of the multiplication array 6 generates partial products. On the other hand, since the selector 5 selects ALL0 data, 0s are supplied as all the input data a<31:0> and b<30:0> of the first stage of the multiplication array 6.

Accumulative addition is performed by using these data, thereby obtaining the Z<15:0> and the sum output FSO<30:0> and carry output FCO<31:0> from the last stage. The outputs FCO<31:0> and FSO<30:0> from the last stage of the multiplication array 6 are written in only the latch circuit 3, the output Z<15:0> is written in only the register 7 because the latch circuit 8 is in a hold state.

(B) Operation in Second Half 2 of Clock in E stage

In the second half 2 (at "L" level) of the clock CLK in E stage, the latch circuit 1 and the latch circuit 2 hold the values written in the first half 1 of the clock CLK, and the selector 4 selects an output (16 high-order bits of a multiplier) from the latch circuit 2. In this case, the 16 high-order bits of the multiplier are supplied to one input terminal of each AND gate of each of the 1st to 16th partial product generation circuits 6a of the multiplication array 6 as an output D<15:0> from the selector 4 in order from <0> to <15>.

The multiplicand A<31 0> held by the latch circuit 1 is supplied to the other input terminal of each AND gate of each of the partial product generation circuits 6a of the multiplication array 6. In this manner, each stage of the multiplication array 6 generates partial products.

The latch circuit 3 holds a value written in the first half 1 of the clock CLK, and the selector 5 selects the outputs CC<31:0> and CS<30:0> from the latch circuit 3. As a result, EC<31:0> is supplied as the input data a<31:0> for the first stage of the multiplication array 6, and ES<30:0> is supplied as the input data b<30:0> for the first stage.

Accumulative addition is performed by using these data, the output Z<15:0> from the multiplication array 6 is written in only the latch circuit 8, and the outputs FCO<31:0> and FSO<30:0> from the last stage of the multiplication array 6 are written in only the latch circuit 9.

(C) Operation in First Half 3 of Clock in M stage

In the first half 3 (at "H" level) in M stage next to E stage, the output G<15:0> from the register 7 is directly used as a final output OUT<15:0>, and the output H<15:0> from the latch circuit 8 is directly used as a final output OUT<31:16>. The outputs OS<30:0> and OC<31:0> from the latch circuit 9 are finally added to each other by the adder 10 to generate I<31:0>, and I<31:0> is directly output as a final output OUT<63:32>.

As described above, according to this embodiment, as shown in FIG. 7, a value passes through the 16 stages of the multiplication array 6 in the first half 1 of the clock CLK to perform half necessary multiplication, and the obtained intermediate result is stored in the latch circuit 3. In the second half 2 of the clock CLK, calculation between the held intermediate result and a result obtained by causing a value to pass through the remaining 16 stages of the multiplication array 6 is performed. In the first half 3 of the next clock CLK, the calculation result is added to the result output from the multiplication array 6, and the addition result is output.

When the above series of operations are performed, the multiplication array can be repeatedly used in units of half clocks such that the multiplication array 6 is divided by two. For this reason, a multiplication device having the same performance as that of the multiplication device shown in FIG. 1 can be obtained by a hardware amount half that of the multiplication device in FIG. 1. In addition, since the multiplication array is divided in units of half clocks, the multiplication array can be easily synchronized with an external circuit and can also be used in a precharge adder.

Figure 8:
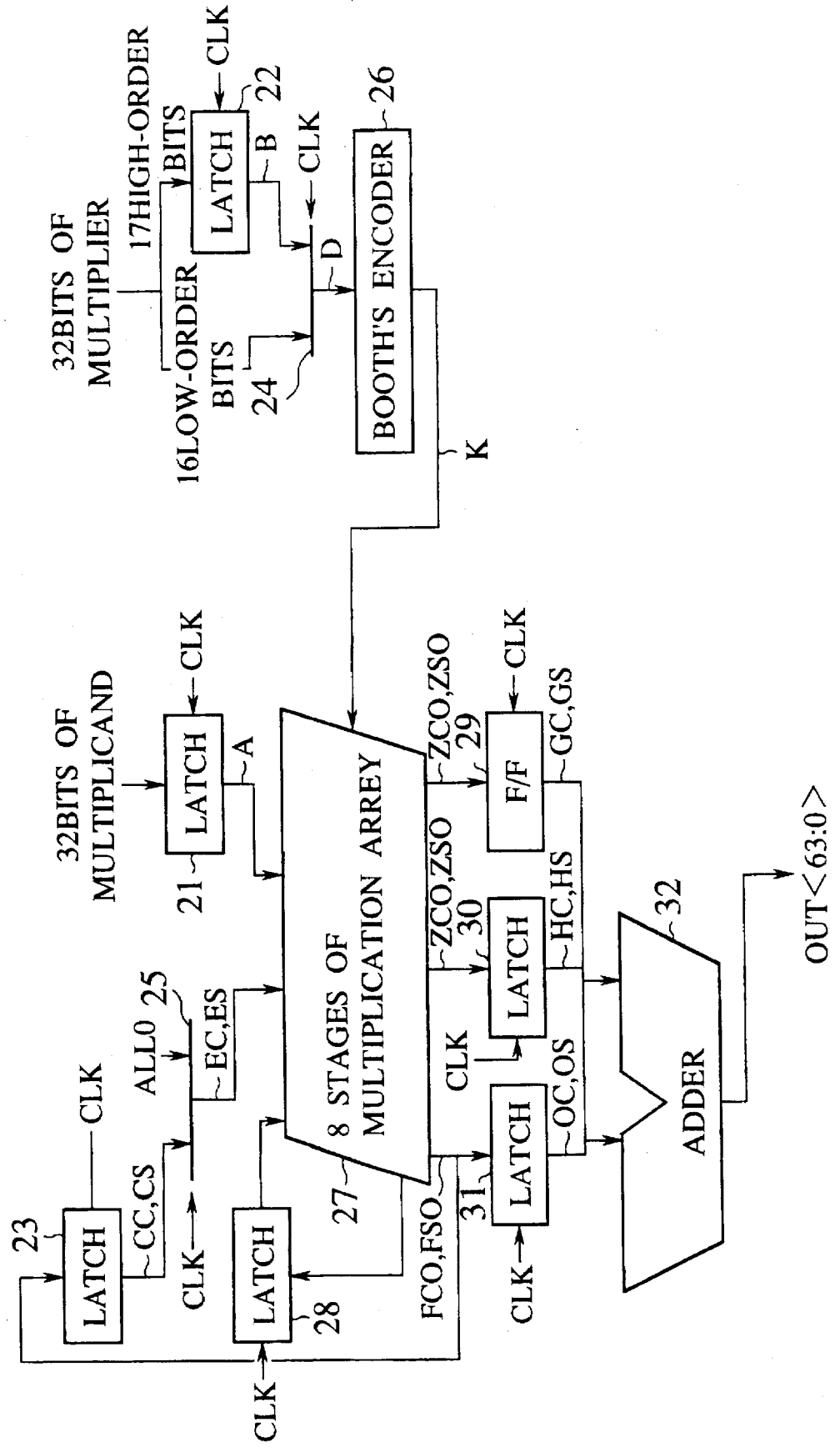
FIG. 8 is a view showing the entire arrangement of a multiplication device according to the second embodiment of the present invention.

FIG. 8 is a view showing the entire arrangement of a multiplication device according to the second embodiment of the present invention.

The multiplication device of this embodiment is a multiplication device for performing multiplication (multiplication with sign) of 32 bits×32 bits by using Booth's algorithm. Since only partial products which are ½ the partial products which are used in the first embodiment are required to be generated when Booth's algorithm is used, an 8-stage multiplication array can be used in place of the 16-stage array in the first embodiment. Therefore, a time for an accumulation addition process can be shortened.

As shown in FIG. 8, the multiplication device of this embodiment comprises a 32-bit latch circuit 21 through which the 32 bits of a multiplicand pass at "H" level of a clock and which holds the 32 bits of the multiplicand at "L" level of the clock, a 17-bit latch circuit 22 through which the 17 high-order bits of the 32 bits of a multiplier pass at "H" level of the clock and which holds the 17 high-order bits at "L" level of the clock, and a 62-bit latch circuit 23 through which intermediate result data output from the last stage of a multiplication array 27 (to be described later) passes at "H" level of the clock and which holds the intermediate result data at "L" level.

The multiplication device also comprises a selector 24 for performing a switching operation between "0"+16 low-order bits of a multiplier and an output from the latch circuit 2 at "H"/"L" level of the clock, and a selector 25 for performing a switching operation between ALL0 data (initial value) in which all 62 bits are 0 data and an output from the latch circuit 23 at "H"/"L" level of the clock.

A Booth's encoder 26 is arranged on the output side of the selector 24. An 8-stage multiplication array 27 is connected to the output sides of the latch circuit 21, the selector 25, and the Booth's encoder 26. The Booth's encoder 26 encodes 17-bit input data according to secondary Booth's algorithm to generate a control signal K for partial product generation.

Each stage of the multiplication array 27 is constituted by a partial product Generation circuit and an accumulative addition circuit (to be described later). The partial product Generation circuit Generates 0 times, 1 times, 2 times, −1 times−1, and −2 times−1 a multiplicand, and selects one of these values on the basis of the control signal K from the Booth's encoder 26. The accumulative addition circuit is constituted by full adders (33 bits) which receives an output from the partial product generation circuit, an accumulative addition result up to this, and −1 and −2 times data for correcting a partial product. Note that the Booth's encoder 26 and the multiplication array 27 will be described later.

A 1-bit latch circuit 28 for holding a sign is connected to the multiplication array 27. This latch circuit 28 is a holding circuit in which the sign of a partial product generated in the eighth stage of the multiplication array 27 is held in the first half of the clock CLK, and the held data is used to extend the sign in the second half of the clock CLK. The latch circuit 28 is set in a through state at "H" level of the clock CLK and in a hold state at "L" level of the clock CLK.

In this case, outputs from the latch circuit 21 and the latch circuit 22 are denoted by A<31:0> and B<16:0>, respectively. A carry output from each stage of the multiplication array 27 is denoted by CO<32:0>, and a sum output is denoted by SO<32:0>. In particular, a carry output CO<32:2> from the last stage of the multiplication array 27 is denoted by FCO<30:0>, and a sum output SO<31:1> from the last stage is denoted by FCO<30:0>. In addition, outputs SO<1:0> and CO<1:0> of the 2 low-order bits of each stage of the multiplication array 27 are denoted by ZSO and ZCO, respectively, the outputs ZSO and ZCO are used as the outputs from the multiplication array 27.

The latch circuit 23 outputs CC<30:0> and CS<30:0> corresponding to the FCO<30:0> and FSO<30:0> which are intermediate result data output from the last stage of the multiplication array 27. The selector 24 outputs D<16:0>, and the selector 25 outputs EC<30:0> corresponding to CC<30:0> or ALL0 data, and outputs ES<30:0> corresponding to CS<30:0> or ALL0 data.

A register (F/F) 29 and latch circuits 30 and 31 are connected to the output side of the multiplication array 27. The register 29 is a 32-bit register for storing, in synchronism with rising of a clock CLK, ZCO<15:0> and ZSO<15:0> output from each stage of the multiplication array 27, and outputs from the register 29 corresponding to ZCO<15:0> and ZSO<15:0> are denoted by GC<15:0> and GS<15:0>, respectively. The latch circuit 30 is a 32-bit latch circuit for holding ZCO<15:6> and ZSO<15:0> like the register 29, and is set in a through state at "L" level of the clock CLK and in a hold state at "H" level of the clock CLK. Outputs from the latch circuit 30 corresponding to ZCO<15:0> and ZSO<15:0> are denoted by HC<15:0> and HS<15:0>, respectively.

The latch circuit 31 holds the outputs FSO<30:0> and FCO<30:0> from the last stage of the multiplication array 27, and is set in a through state at "L" level of the clock CLK and in a hold state at "H" level of the clock CLK. Outputs from the latch circuit 31 corresponding to FSO<30:0> and FCO<30:0> are denoted by OS<30:0> and OC<30:0>, respectively.

An adder 32 is connected to the output sides of the F/F 29 and the latch circuits 30 and 31. The adder 32 finally adds the carry outputs and sum outputs of each bit of a multiplication result set in a carry save form to output OUT<63:0> as an output from the multiplication device.

The Booth's encoder 26 and the multiplication array 27 which are characteristic parts in this embodiment will be described below. The Booth's encoder 26 encodes an output from the selector 24 according to Booth's algorithm as described above. In this case, encode using Booth's algorithm will be briefly described below.

A product Z between a multiplicand X and a multiplier Y is expressed as Z=X*Y. When the multiplier Y is expressed by 2's complement, the multiplier Y is expressed by equation (1):

$$Y = -y_n * 2^{n-1} + \sum_{i=1}^{n-1} y_i * 2^{i-1} \quad (1)$$

When n is an even number, and a numerical portion is divided into even-number bits and odd-number bits, equation (2) is obtained:

$$\sum_{i=1}^{n-1} y_i * 2^{i-1} = \sum_{i=1,odd}^{n-1} y_i * 2^{i-1} + \sum_{i=0,even}^{n-2} y_i * 2^{i-1} - y_0 * 2^{-1} \quad (2)$$

Furthermore, the odd-number portion can be transformed as expressed by equation (3):

$$\sum_{i=1,odd}^{n-1} y_i * 2^{i-1} = \sum_{i=0,even}^{n-2} y_{i+1} * 2^i \quad (3)$$

A sign portion can be transformed as expressed by equation (4):

$$-y_n * 2^{n-1} = -\left( \sum_{i=0,even}^{n} y_i * 2^{i-1} - \sum_{i=0,even}^{n-2} y_i * 2^{i-1} \right) \quad (4)$$

$$= -\left( \sum_{i=0,even}^{n} y_{i+2} * 2^{i+1} + y_0 * 2^{-1} - \sum_{i=0,even}^{n-2} y_i * 2^{i-1} \right)$$

For this reason, the multiplier Y can be expressed by equation (5):

$$Y = -\sum_{i=0,\text{even}}^{n-2} y_{i+2} * 2^{i+1} - y_0 * 2^{-1} - \sum_{i=0,\text{even}}^{n-2} y_i * 2^{i-1} + \quad (5)$$

$$\sum_{i=0,\text{even}}^{n-2} y_{i+2} * 2^i + \sum_{i=0,\text{even}}^{n-2} y_i * 2^{i-1} - y_0 * 2^{-1}$$

$$= \sum_{i=0,\text{even}}^{n-2} y_i * 2^i + \sum_{i=0,\text{even}}^{n-2} y_{i+1} * 2^i - 2 \sum_{i=0,\text{even}}^{n-2} y_{i+2} * 2^i - y_0$$

$$= \sum_{i=0,\text{even}}^{n-2} (y_i + y_{i+1} - 2 * y_{i+2}) * 2^i \; (y_0 = 0)$$

In this case, when $i=2j$, equation (6) is established:

$$Y = \sum_{j=0}^{n/2-1} (y_{2j} + y_{2j+1} - 2 * y_{2j+2}) * 2^{2j} \quad (6)$$

Therefore, the product Z can be expressed by equation (7):

$$Z = X * \sum_{j=0}^{n/2-1} (y_{2j} + y_{2j+1} - 2 * y_{2j+2}) * 2^{2j} \quad (7)$$

(Supervised by Takuo Sugano, Edited by Testuya Iizuka, "Design of CMOS Very High Speed LSI", Baifukan (1989) pp. 224–226).

As is apparent from equation (7), when Booth's algorithm is used, partial products can be generated by a 5-input selector having 3 adjacent bits of the multiplier Y as a selection condition and a select signal for controlling the selector.

Therefore, the Booth's encoder 26 has a function of generating 5 (5 bits) select signals K for controlling the 5-input selector to each stage of the multiplication array 27. That is, 5 signals K are present for each stage because the signals K are used for the 5-input selector. Since the multiplication array 27 is constituted by 8 stages, 40 select signal K<39:0> are used.

The arrangement and function of the multiplication array 27 will be described below with reference to FIGS. 9, 10, and 11. Note that FIG. 9 is a view showing the high-order bit arrangement of the multiplication array, 27 in FIG. 8, FIG. 10 is a view showing the low-order bit arrangement of the multiplication array 27, and FIG. 11 is a schematic view showing the arrangement of the third to eighth stages of the multiplication array 27.

Figure 9:
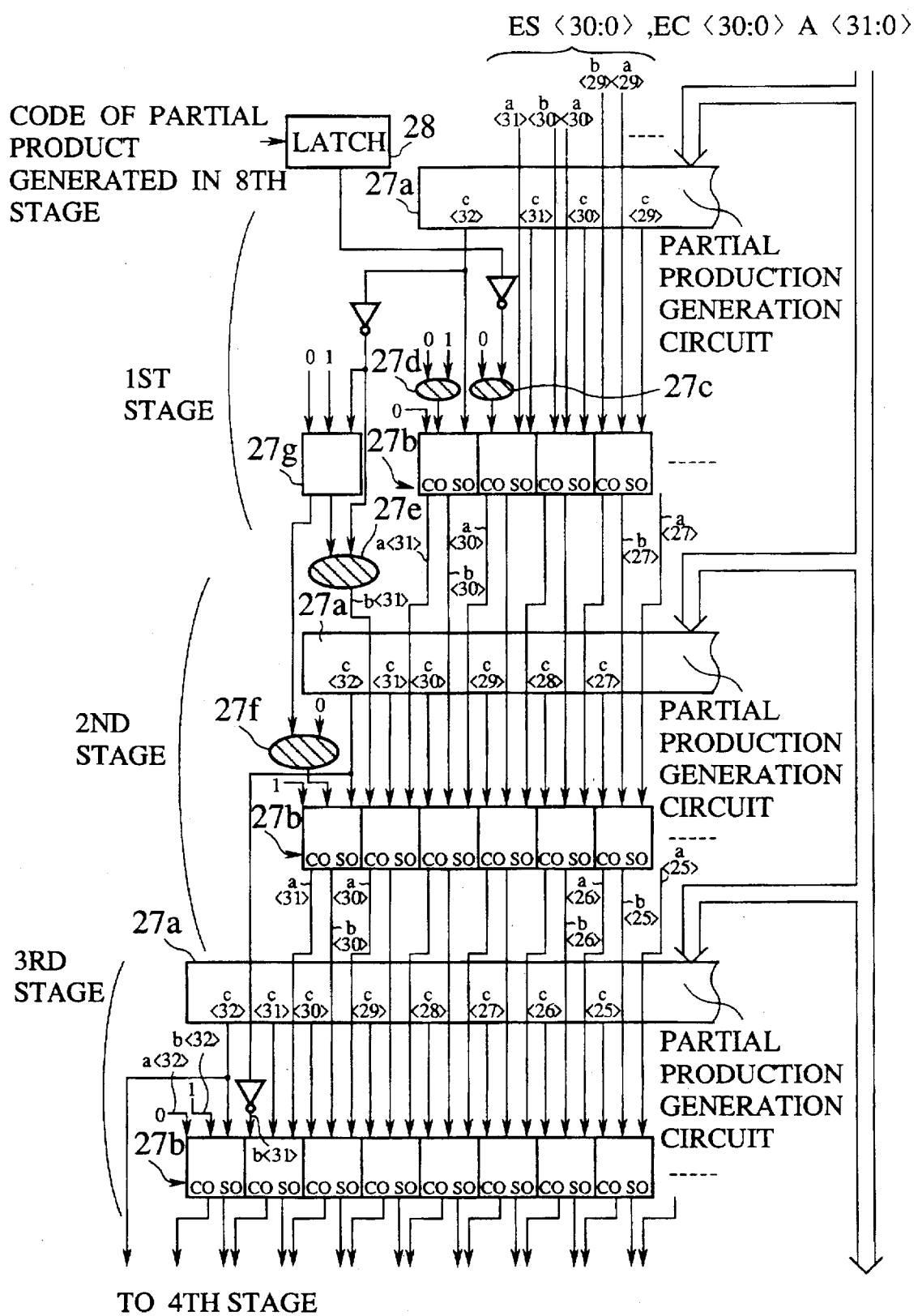
FIG. 9 is a view showing the arrangement of a multiplication array on a high-order bit side in the second embodiment.
Figure 10:
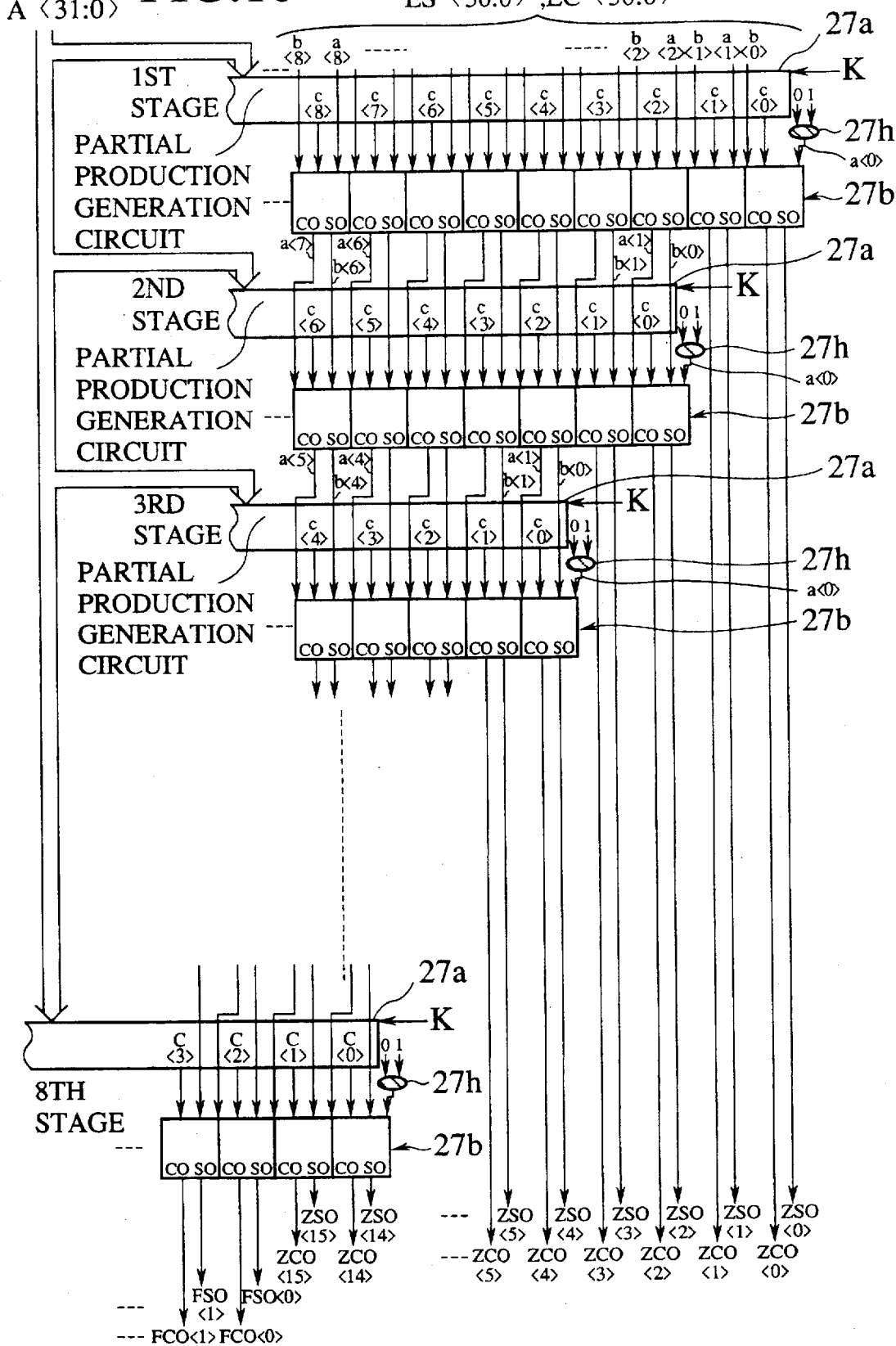
FIG. 10 is a view the arrangement of a multiplication array on a low-order bit side in the second embodiment.
Figure 11:
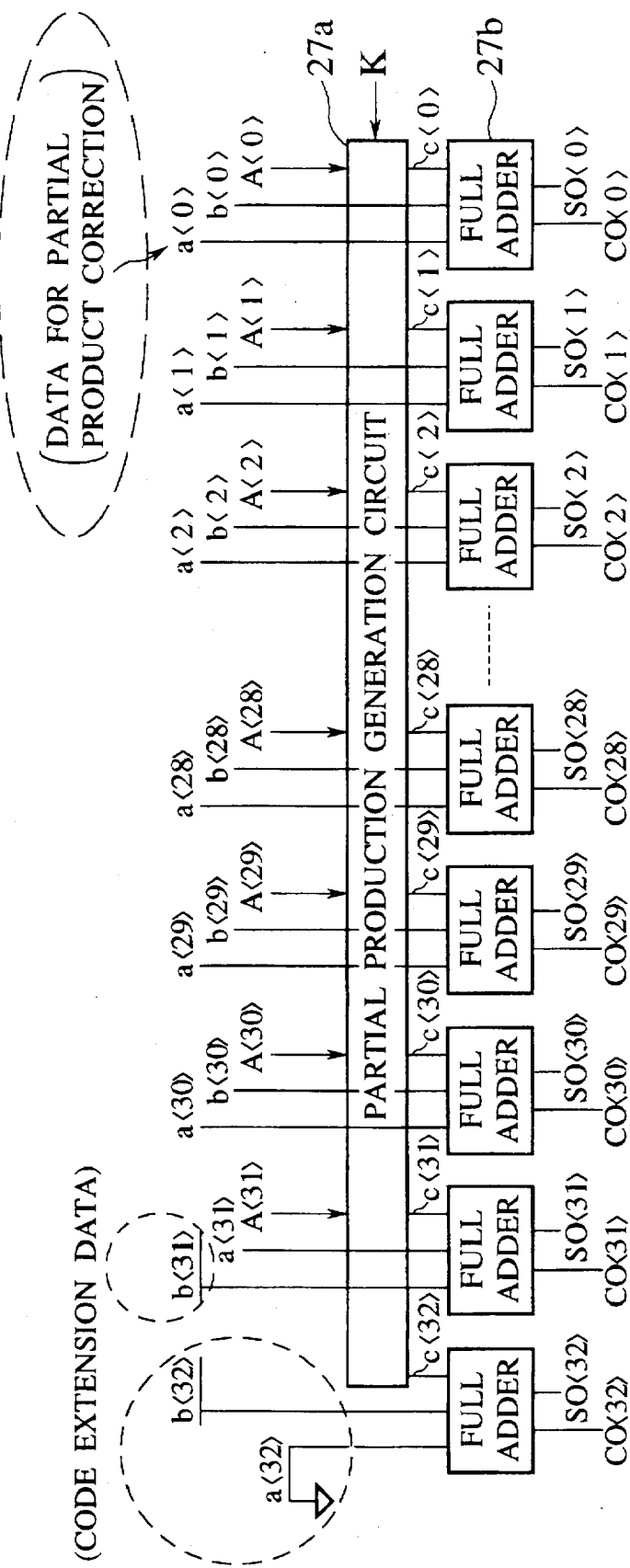
FIG. 11 is a schematic view showing the arrangement of the third to eighth stages of the multiplication array in the second embodiment.

As shown in FIGS. 9 to 11, each stage of the multiplication array 27 is constituted by a partial product generation circuit 27a for generating partial products and an accumulative addition circuit 27b for performing accumulative addition on the basis of the partial products generated by the partial product generation circuit 27a.

The partial product generation circuit 27a must be originally constituted by a means for generating partial products required for Booth's algorithm described above, i.e., (−2, −1, 0, 1, and 2) times a multiplicand, and a selector for selecting one of these values on the basis of the 5 select signals K supplied from the Booth's encoder 26. However, since "1" must be added to −2 times and −1 times the multiplicand after each bit is inverted in generation, a time loss And a hardware loss are large.

Therefore, −2 times and −1 times the multiplicand are only inverted in the partial product generation circuit 27a of each stage in this embodiment. "1" is added to the values in the following accumulative addition. More specifically, the partial product generation circuit 27a of each stage generates 2 times, 1 times, 0 times, −2 times−1, and −1 times−1 the multiplicand, and one of these values is selected on the 5 select signals K from the Booth's encoder 26. At this time, when ±2 times the multiplicand is obtained, 32-bit data changes into 33-bit data. For this reason, the selector of the partial product generation circuit 27a of each stage outputs all data as 33-bit data c<32:0> (see FIG. 11).

The accumulative addition circuit 27b of each stage is constituted by full adders of 33 bits because the 33-bit partial products are generated by the partial product generation circuit 27a. In correspondence with multiplication using Booth's algorithm, sign extension must be performed in the most significant bit of the accumulative addition circuit 27b.

More specifically, sign extension performed when partial products are added to each other according to Booth's algorithm is performed in the following manner. For example, for descriptive convenience, multiplication of 8-bit numbers is exemplified. In this case, when the signs of the partial products are represented by SGN1, SGN3, SGN5, and SGN7 in order from the low-order bit side, equation (8) is obtained:

$$(2^7 + 2^6 + \ldots + 2^0)SGN1 + (2^7 + 2^6 + \ldots + 2^2)SGN3 + \quad (8)$$
$$(2^7 + 2^6 + \ldots + 2^4)SGN5 + (2^7 + 2^6)SGN7 =$$
$$-2^0 \cdot \underline{SGN1} - 2^2 \cdot \underline{SGN3} - 2^4 \cdot \underline{SGN5} - 2^6 \cdot \underline{SGN7}(\text{Mod } 2^8) =$$
$$2^7 + 2^6 \cdot \overline{SGN7} + 2^5 + 2^4 \cdot \overline{SGN5} + 2^3 + 2^2 \cdot \overline{SGN3} + 2 + \overline{SGN1} + 1$$

(Supervised by Takuo Sugano, Edited by Susumu Kayama "Very High Speed Digital Device Series, Very High Speed MOS Device", Baifukan (1986) p. 296).

Therefore, sign extension is performed such that signals and circuits required to satisfy an equation obtained by extending equation (8) for 32-bit data are additionally used.

In this embodiment, although multiplication is originally performed at once, multiplication is separately performed in the first and second halves of the clock CLK. In accordance with the multiplication, in each of the 1st and 9th stages of the multiplication array used in multiplication performed at once, different extension operations must be performed the same hardware. For this reason, a necessary hardware is selected by selectors using the clock CLK as a selection signal. These selectors are shown in FIG. 9 as selectors 27c and 27d on the high-order bit side of the first stage of the multiplication array 27 and selectors 27e and 27f on the high-order bit side of the second stage.

In addition, between the last stage (8th stage) and the first stage (1st stage) of the multiplication array 27, the signs of partial products generated by the 8th stage must be held for sign extension. For this reason, the latch circuit 28 having the same operation as that of the latch circuit (intermediate result holding circuit) 23 is arranged, the signs of the partial products generated by the 8th stage are written in the latch circuit 28 in the first half of the clock, and the signs is input in the second half of the clock to the accumulative addition circuit 27b of the first stage as an input for sign extension.

More specifically, in the first stage of each accumulative addition circuit 27b of the multiplication array 27, as shown in FIG. 9, in addition to the full adders of 33 bits, a full adder 27g for sign extension is also arranged. The full adder 27g and full adders (a<32> and b<32:31> in FIG. 9) of the two high-order bits (32nd and 33rd bits) perform sign extension, and the result is given to the second stage. In the accumulative addition circuit 27b of the second stage, as shown in FIG. 9, sign extension is performed by the full adders of the two high-order bits (32nd and 33rd bits) using the selectors 27e and 27f, and the result is given to the third stage. In each of the stages following the third stage, shown in FIG. 9, sign extension is performed by the full adders of the two high-order bits (32nd and 33rd bits), and the result is given to the next stage, thereby inputting an output C<32> from the partial product generation circuit 27a of the last stage (8th stage) to the latch circuit 28.

The accumulative addition circuit 27b of each stage adds the accumulative addition result of the previous stage to partial products generated by the partial product generation circuit 27a of this stage (to be described later). In this case, however, when −2 times or −1 times a multiplicand is selected as a partial product on the basis of a Booth's encode result (select signal K), "1" is input to a<0> (corresponding to carry in) serving as one of inputs of the full adder of the least significant bit of the accumulative addition circuit 27b, values other than −2 times or −1 times the multiplicand are selected, "0" is input. This switching operation is performed by a selector 27h arranged in each stage as shown in FIG. 10.

In the accumulative addition circuit 27b of the first stage, outputs ES<30:0> and EC<30:0> from the selector 25 are added to the partial products c<32:0> generated by the partial product generation circuit 27a of the first stage. Of the obtained outputs CO<32:0> and SO<32:0> from the first stage, outputs CO<1:0> and SO<1:0> are externally output as ZCO<1:0> and ZSO<1:0>, and the remaining outputs CO<32:2> and SO<32:2> are supplied to the accumulative addition circuit 27b of the second stage as input data a<31:1> and b<30:0>.

In the accumulative addition circuit 27b of the second stage, the intermediate result from the first stage is accumulatively added to the partial products generated by the partial product generation circuit 27a of the second stage. Of the obtained outputs CO<32:0> and SO<32:0> from the second stage, outputs CO<1:0> and SO<1:0> are externally output as ZCO<3:2> and ZSO<3:2>, and the remaining outputs CO<32:2> and SO<32:2> are supplied to the accumulative addition circuit 27b of the third stage as input data a<31:1> and b<30:0>.

In the accumulative addition circuit 27b of each of the stages following the third stage, as in the connection between the first and second stages, the ith stage is exemplified. In this case, outputs SO<1:0> and CO<1:0> from the ith stage are externally output as ZSO<2i−1:2i−2> and ZCO<2I−1:2i−2>, and the remaining outputs SO<32:2> and CO<32:2> are output as input data b<30:0> and a<31:1> of the (i+1)th stage, respectively. Outputs SO<1:0> and CO<1:0> from the 8th stage serving as the last stage are output as ZSO<15:14> and ZCO<15:14>, respectively, and the remaining outputs SO<32:2> and CO<32:2> are externally output without any change.

The multiplication operation of the multiplication device according to this embodiment arranged as described above will be described below with reference to FIG. 12.

(A) Operation in First Half 1 of Clock in E stage

Figure 12:
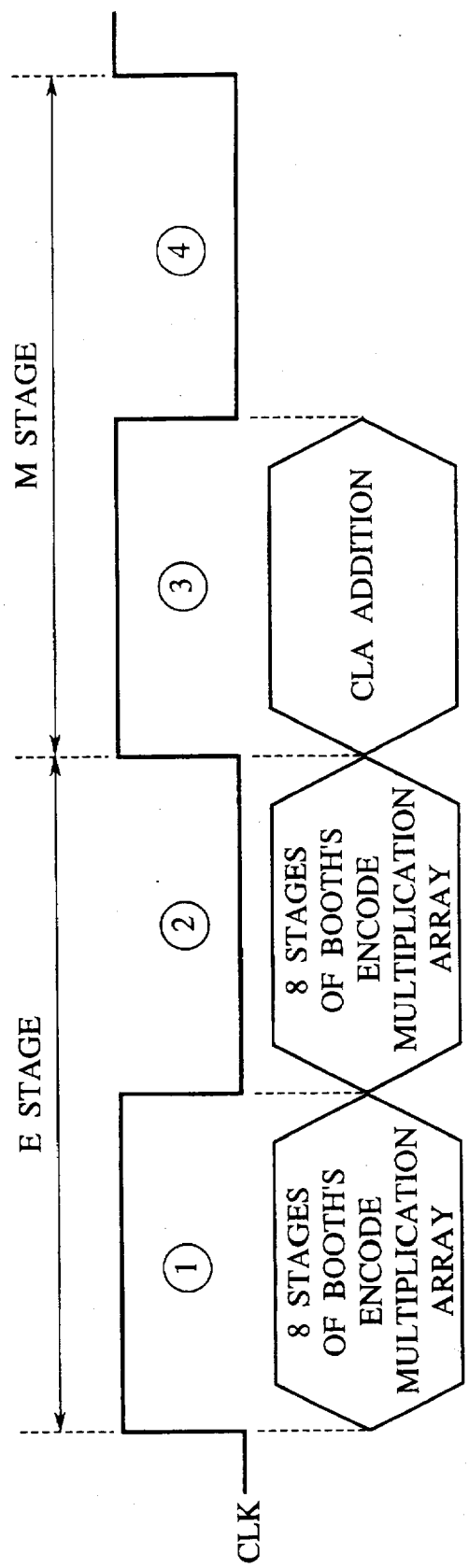
FIG. 12 is a view for explaining the multiplication operation of the multiplication device according to the second embodiment.

As shown in FIG. 12, in the first half 1 ("H" level) of the clock CLK in E stage, the moment the 32 bits of a multiplicand are written in the latch circuit 21, the 17 high-order bits of a multiplier are written in the latch circuit 22. The selector 24 selects 17-bit data obtained by adding "0" to the low order of the 16 low-order bits of the multiplier. Since the multiplier has 32 bits, the 16th bit from the least significant bit of the multiplier is stored in the latch circuit 22 and supplied to the Booth's encoder 26 even in the first half of the clock CLK.

When the selector 24 selects the low-order side of the multiplier, an output D<16:0> from the selector 24 is encoded by the Booth's encoder 26, and is supplied to the partial product generation circuit 27a of each stage of the multiplication array 27 as a select signal K. At this time, since the latch circuit 21 is in a through state, an output A<31:0> (serving as a multiplicand) from the latch circuit 21 is supplied to the partial product generation circuit 27a of each stage of the multiplication array 27. In this manner, partial products (0 times, 1 times, 2 times, −1 times −1, and −2 times −1) are generated by the partial product generation circuit 27a of each stage of the multiplication array 27.

Since the selector 25 selects ALL0 data (all of them are set to be "0") for EC<30:0> and ES<30:0>, "0"" is supplied as all the input data a<31:1> and b<30:0> of the accumulative addition circuit 27b of the first stage. Data (1/0) for correcting partial product generation is input as input data a<0> of the accumulative addition circuit 27b of each stage. Sign extension data are input as a<32> and b<32:31>.

When accumulative addition is performed by using these data, ZCO<15:0> and ZOS<15:0> are output from the multiplication array 27, and FSO<30:0> and FCO<30:0> are output from the last stage. Of these outputs, the outputs FCO<30:0> and FSO<30:0> are written in only the latch circuit 23, and the outputs ZCO<15:0> and ZSO<15:0> are written in only the register 29 because the latch circuit 30 is set in a hold state.

The signs of the partial products generated by the last stage of the multiplication array 27 are stored in the latch circuit 28.

(B) Operation in Second Half 2 of Clock in E stage

In the second half 2 (at "L" level) of the clock CLK in E stage, the latch circuit 21 and the latch circuit 22 hold the values written in the first half 1 of the clock CLK, and the selector 24 selects an output (17 high-order bits of a multiplier) from the latch circuit 22. In this case, an output D<16:0> from the selector 24 is encoded by the Booth's encoder 26 and supplied to the partial product generation circuit 27a of each stage of the multiplication array 27 as a select signal K. At this time, an output A<31:0> (multiplicand) from the latch circuit 21 is supplied to the partial product generation circuit 27a of each stage of the multiplication array 27. Therefore, a partial product (one of 0 times, 1 times, 2 times, −1 times −1, and −2 times −1 the multiplicand) is generated.

Since the selector 25 selects CC<30:0> and CS<30:0> as EC<30:0> and ES<30:0>, respectively, CC<30:0> and CS<30:0> are supplied as input data a<31:1> and b<30:0> of the accumulative addition circuit 27b of the first stage, respectively. Data (1/0) for correcting partial product generation is input as input data a<0> of the accumulative addition circuit 27b of each state. Sign extension data are input as a<32> and b<32:31>.

When accumulative addition is performed by using these data, ZCO<15:0> and ZOS<15:0> are output from the multiplication array 27, and FSO<30:0> and FCO<30:0> are output from the last stage. Of these outputs, the outputs FCO<30:0> and FSO<30:0> are written in the latch circuit 31, and the outputs ZCO<15:0> and ZSO<15:0> are written in the latch circuit 30.

(C) Operation in First Half 3 of Clock in M stage

In the first half 3 (at "H" level) of the clock CLK in M stage next to E stage, the adder 32 performs the following final addition to obtain an output OUT<63:0>

{OC<30:0>, HC<15:0>, GC<15:0>, 0}+{0, OS<30:0>, HS<15:0>, GS<15:0>}

As described above, according to this embodiment, Booth's encode for the 16 low-order bits of the multiplier is performed in the first half 1 of the clock CLK as shown in FIG. 12. The resultant value passes through the 8 stage of the multiplication array to perform half necessary multiplication, and the intermediate result is stored in the latch circuit 23. In the second half 2 of the clock CLK, the 17 high-order bits of the multiplier is encoded. Calculation and accumulative addition between the encode result and the stored intermediate result are performed. In the first half 3 of the clock CLK, output results from the multiplication array 27 are added to each other, and the addition result is output.

With the above series of operations, the number of multiplication array stages through which a value passes can be made ½ the number of multiplication array stages in the first embodiment, a time required to pass through the multiplication array can be shortened.

Figure 13:
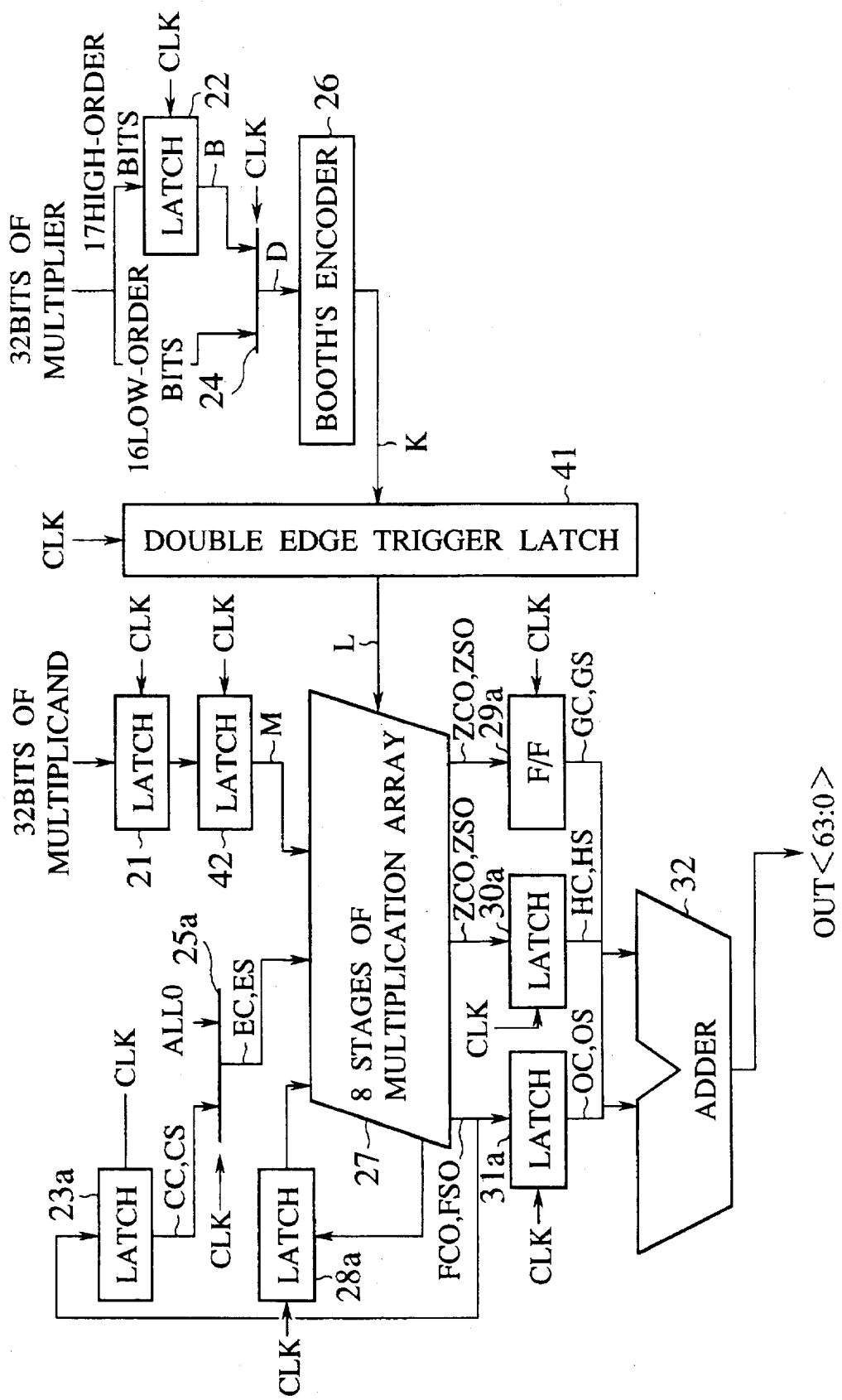
FIG. 13 is a view showing the entire arrangement of a multiplication device according to the third embodiment of the present invention.

FIG. 13 is a view showing the entire arrangement of a multiplication device according to the third embodiment of the present invention. The same reference numerals as in FIG. 8 denote the same parts in FIG. 13.

In the second embodiment, although high-speed multiplication can be performed by reducing the number of stages of the multiplication array, the Booth's encoder 26 requires a predetermined time for encoding. For this reason, according to this embodiment, in consideration of this point, a double edge trigger latch circuit 41 is inserted between the Booth's encoder 26 and the multiplication array 27. In this case, although a calculation time increases by a half cycle, required times for processes performed in half cycles are almost equal to each other. Therefore, a multiplication device which can be controlled by a clock having a frequency higher than that of the second embodiment can be provided.

More specifically, the multiplication device of this embodiment is obtained in the following manner. That is, in the multiplication device of the second embodiment shown in FIG. 8, the double edge trigger latch circuit 41 having an output which changes at an edge of a clock CLK is inserted between the Booth's encoder 26 and the multiplication array 27, a 32-bit latch circuit 42 is inserted between the latch circuit 21 and the multiplication array 27. A latch circuit 23a, a selector 25a, a latch circuit 28a, a register 29a, a latch circuit 30a, and a latch circuit 31a which respectively have functions different from the latch circuit 23, the selector 25, the latch circuit 28, the register 29, the latch circuit 30, and the latch circuit 31 are arranged in place of these parts. Assume that an output from the double edge trigger latch circuit 41 is L<39:0> and that an output from the latch circuit 42 is M<31:0>. In this case, the outputs L<39:0> and M<31:0> are supplied to the multiplication array 27 in place of K<39:0> and A<39:0>. The remaining arrangement of the third embodiment is the same as that of the second embodiment.

The latch circuit 23a, the selector 25a, the latch circuit 28a, the register 29a, the latch circuit 30a, and the latch circuit 31a are different from those of the second embodiment in the following points. The latch circuit 23a is set in a through state at "L" level of the clock CLK and in a hold state at "H" level of the clock CLK. The selector 25a performs a switching operation between an output from the latch circuit 23a and ALL0 data at "H" level/"L" level. The latch circuit 28a is set in a through state at "L" level of the clock CLK and in a hold state at "H" level of the clock CLK, and the register 29a is set in a write state at "L" level and in an output state at "H" level. The latch circuit 30a is set in a through state at "H" level of the clock CLK and in a hold state at "L" level of the clock CLK, and the latch circuit 31a is set in a through state at "H" level of the clock CLK and in a hold state at "L" level of the clock CLK. Note that the input data and bit arrangements of the latch circuits 23a, 28a, 30a, and 31a and the register 29a are the same as those of the latch circuits 23, 28, 30, and 31 and the register 29 in the second embodiment.

Figure 14:
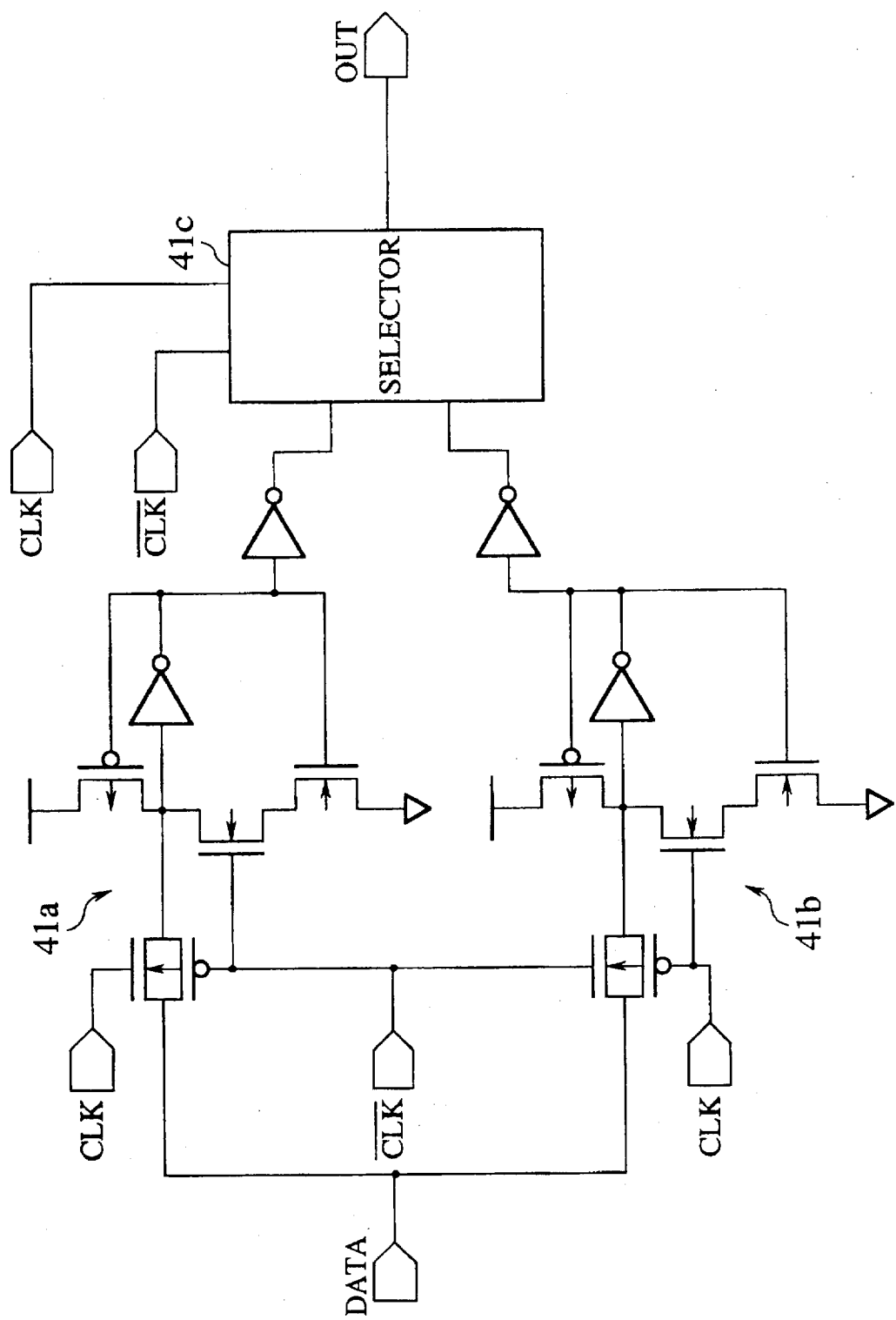
FIG. 14 is a circuit diagram of a double edge trigger latch circuit.
Figure 15:
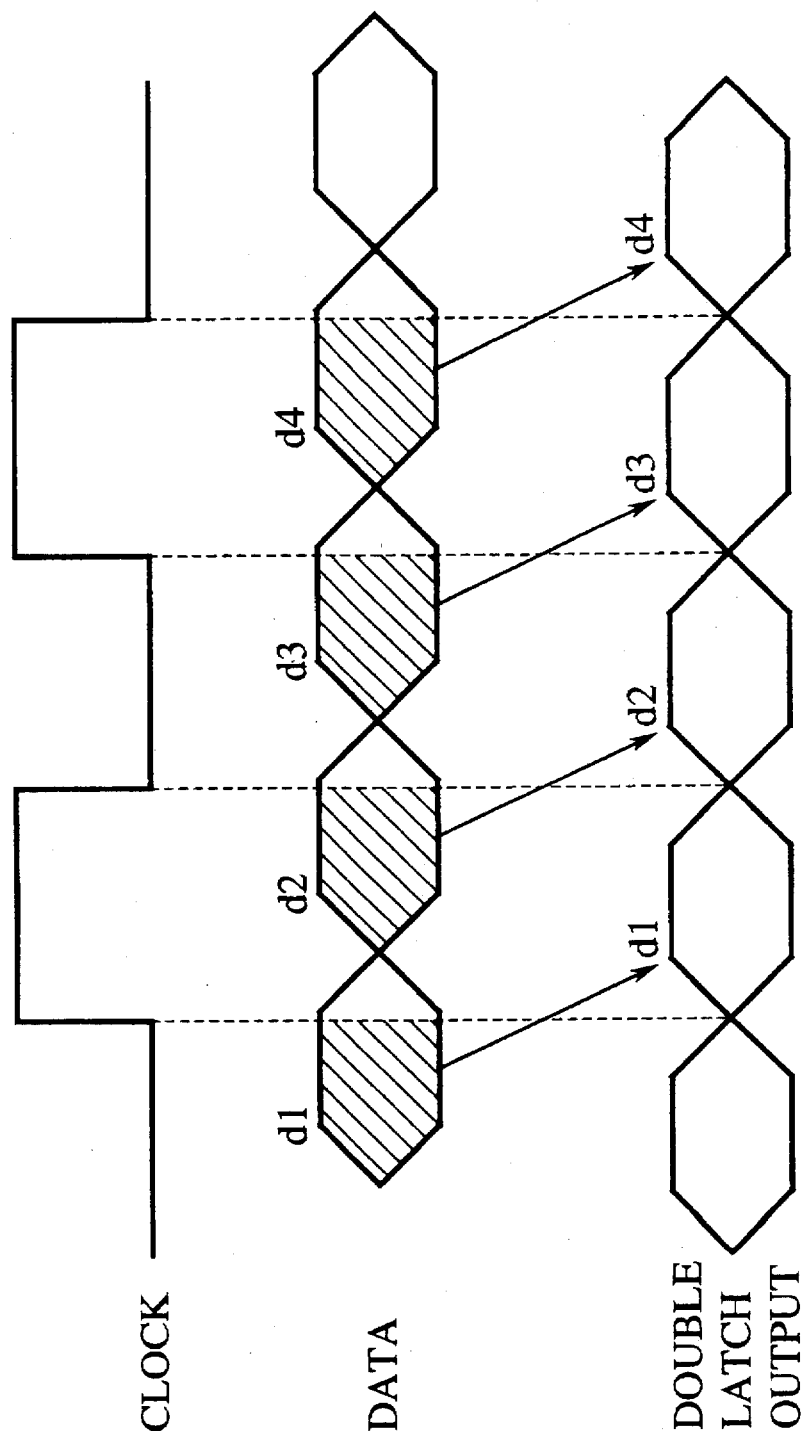
FIG. 15 is a flow chart showing the operation of the double edge trigger latch circuit in FIG. 14.

FIG. 14 is a circuit diagram showing the arrangement of the double edge trigger latch circuit 41, and FIG. 15 is a time chart showing the operation of the double edge trigger latch circuit 41.

The double edge trigger latch circuit 41 of this embodiment is constituted by a pair of latch circuits 41a and 41b which respectively operate in opposite phases, and a selector 41c for selecting one of outputs from the latch circuits 41a and 41b on the basis of the value of the clock CLK.

In its operation, as shown in FIG. 15, when the clock CLK is inverted when an input is data d1, an output from the double edge trigger latch circuit 41 changes into data d1. At this time, even if the input changes into data d2, the output is held as data d1. Thereafter, when the clock CLK is inverted, the output changes into the data d2. As in the above case, even if the input changes, the output is held as data d2. That is, an operation in which an input is held and output is performed each time the clock CLK changes. The latch circuit 42 is set in a through state at "L" level of the clock CLK and in a hold state at "H" level of the clock CLK.

The multiplication operation of the multiplication device of this embodiment arranged as described above will be described below with reference to FIG. 16.

(A) Operation in First Half 1 of Clock in E stage

Figure 16:
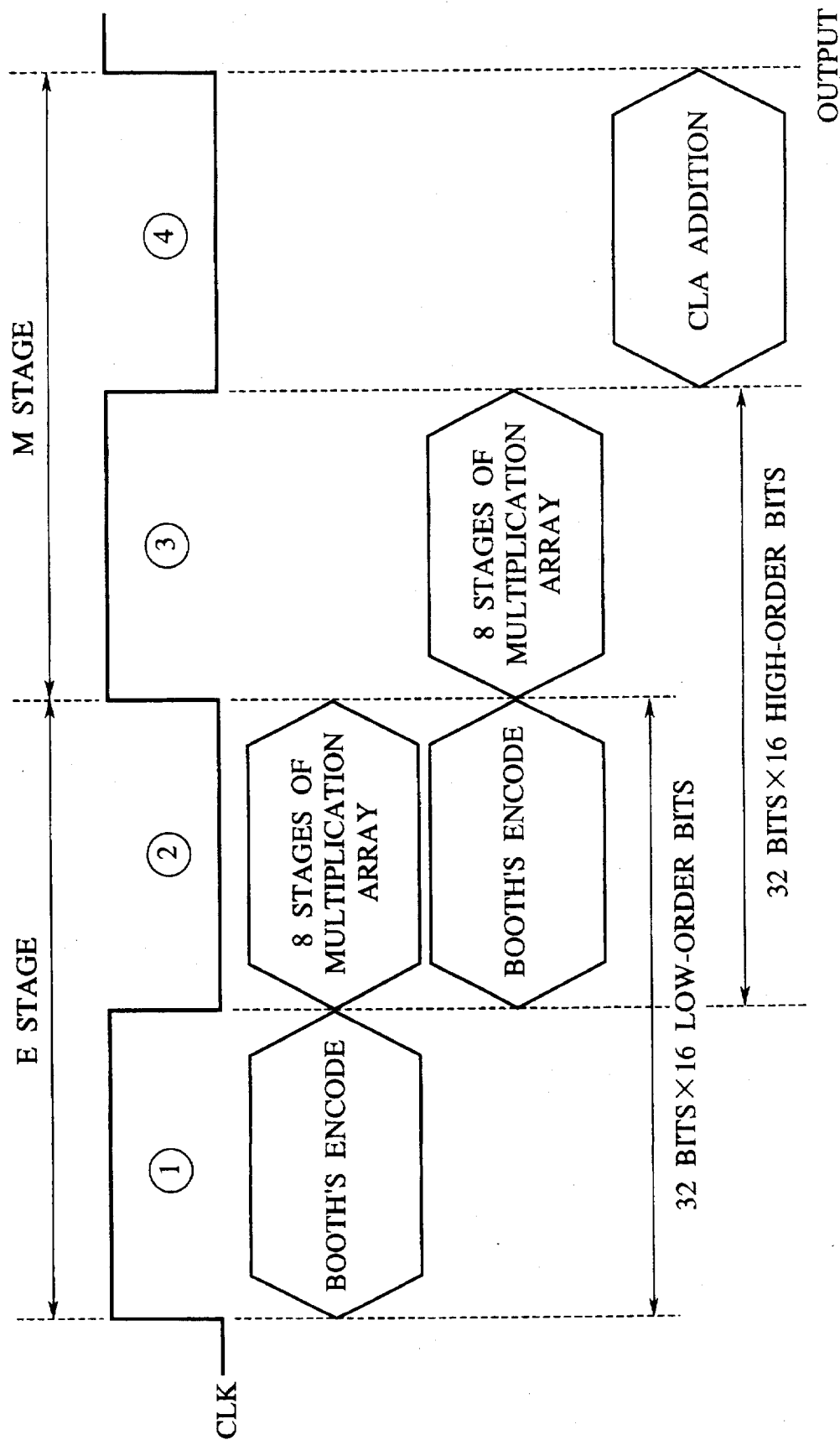
FIG. 16 is a view for explaining the multiplication operation of the multiplication device according to the third embodiment.

As shown in FIG. 16, in the first half 1 ("H" level) of the clock CLK in E stage, the moment the 32 bits of a multiplicand are written in the latch circuit 21, the 17 high-order bits of a multiplier are written in the latch circuit 22. The selector 24 selects 17-bit data obtained by adding "0" to the low order of the 16 low-order bits of the multiplier.

When the selector 24 selects the low-order side of the multiplier, an output D<16:0> from the selector 24 is encoded by the Booth's encoder 26, and the encode result is stored in the double edge trigger latch circuit 41.

(B) Operation in Second Half 2 of Clock in E stage

In the second half 2 (at "L" level) of the clock CLK in E stage, an output A<31:0> from the latch circuit 21 is stored in the latch circuit 42, an output M<31:0> from the latch circuit 42 is supplied to the partial product generation circuit 27a of each stage of the multiplication array 27. An encode result from the Booth's encoder 26 stored in the first half i of the clock CLK is supplied by the double edge trigger latch circuit 41 to the partial product generation circuit 27a of each stage of the multiplication array 27. In this manner, a partial product is generated by the partial product generation circuit 27a of each stage of the multiplication array 27.

Since the selector 25a selects ALL0 data for EC<30:0> and ES<30:0>, "0" is supplied as all the input data a<31:1> and b<30:0> of the accumulative addition circuit 27b of the first stage. Data (1/0) for correcting partial product generation is input as input data a<0> of the accumulative addition circuit 27b of each stage. Sign extension data are input as a<32> and b<32:31>.

When accumulative addition is performed by using these data, ZCO<15:0>, ZOS<15:0>, FSO<30:0>, and FCO<30:0> are output from the multiplication array 27. Of these outputs, the outputs FCO<30:0> and FSO<30:0> are written in the latch circuit 23a, and the outputs ZCO<15:0> and ZSO<15:0> are written in the register 29a. The sign of a partial product generated by the last stage of the multiplication array 27 is stored in the latch circuit 28a.

The selector 24 selects an output from the latch circuit 22, and an output D<16:0> from the selector 24 is encoded by the Booth's encoder 26. The encode result K is stored in the double edge trigger latch circuit 41.

(C) Operation in Second Half 3 of Clock in E stage

In the second half 3 (at "H" level) of the clock CLK in E stage, the latch circuit 42 holds the value written in the second half 2 of the clock CLK, and an output M<31:0> from the latch circuit 42 is supplied to the partial product generation circuit 27a of each stage of the multiplication array 27. The encode result stored in the second half 2 of the clock CLK is supplied from the double edge trigger latch circuit 41 to the partial product generation circuit 27a of each stage of the multiplication array 27. In this manner, a partial product is generated by the partial product generation circuit 27a of each stage of the multiplication array 27.

Since the selector 25a selects an output from the latch circuit 23a, CC<30:0> and CS<30:0> are supplied as the input data a<31:0> and b<30:0> of the accumulative addition circuit 27b of the first stage. Data (1/0) for correcting partial product generation is input as input data a<0> of the accumulative addition circuit 27b of each stage. Sign extension data are input as a<32> and b<32:31>.

When accumulative addition is performed by using these data, ZCO<15:0>, ZOS<15:0>, FSO<30:0>, and FCO<30:0> are output from the multiplication array 27. Of these outputs, the outputs FCO<30:0> and FSO<30:0> are written in the latch circuit 31a, and the outputs ZCO<15:0> and ZSO<15:0> are written in the register 30a.

(D) Operation in Second Half 3 of Clock in M stage

In the second half 4 (at "L" level) in M stage next to E stage, the adder 32 performs the following final addition to obtain an output OUT<63:0>

{OC<30:0>, HC<15:0>, GC<15:0>, 0}+{0, OS<30:0>, HS<15:0>, GS<15:0>}

As described above, according to this embodiment, Booth's encode for the 16 low-order bits of the multiplier is performed in the first half 1 of the clock CLK as shown in FIG. 16. The resultant value is stored in the double edge trigger latch circuit 41. In the second half 2 of the clock, the Booth's encode result is output from the double edge trigger latch circuit 41, and the resultant value passes through the 8 stages of the multiplication array to perform half necessary multiplication. This output is stored in the latch circuit 23a as intermediate result data. Furthermore, Booth's encode is performed to the 17 high-order bits of the multiplier while the value passes through the multiplication array 27, and the encode result is stored in the double edge trigger latch circuit 41. In the first half 3 of the clock, calculation and accumulative addition between the stored intermediate result data and a value which passes through the remaining 8 stages of the multiplication array 27 is performed. In the second half 4 of the next clock CLK, output results from the multiplication array 27 are added to each other, and an output OUT from the multiplication device is obtained. In this manner, the series of operations are performed.

In the second embodiment, although the number of stages of the multiplication array 27 is reduced, the passing time of the Booth's encoder 26 is an overhead time. In contrast to this, in the third embodiment, when a half clock is assigned as an encode time of the Booth's encoder 26, and the double edge trigger latch circuit 41 is used, times required for processes performed in half cycles are almost equal to each other. For this reason, the frequency of the clock CLK can be made higher than that of the second embodiment.

Figure 17:
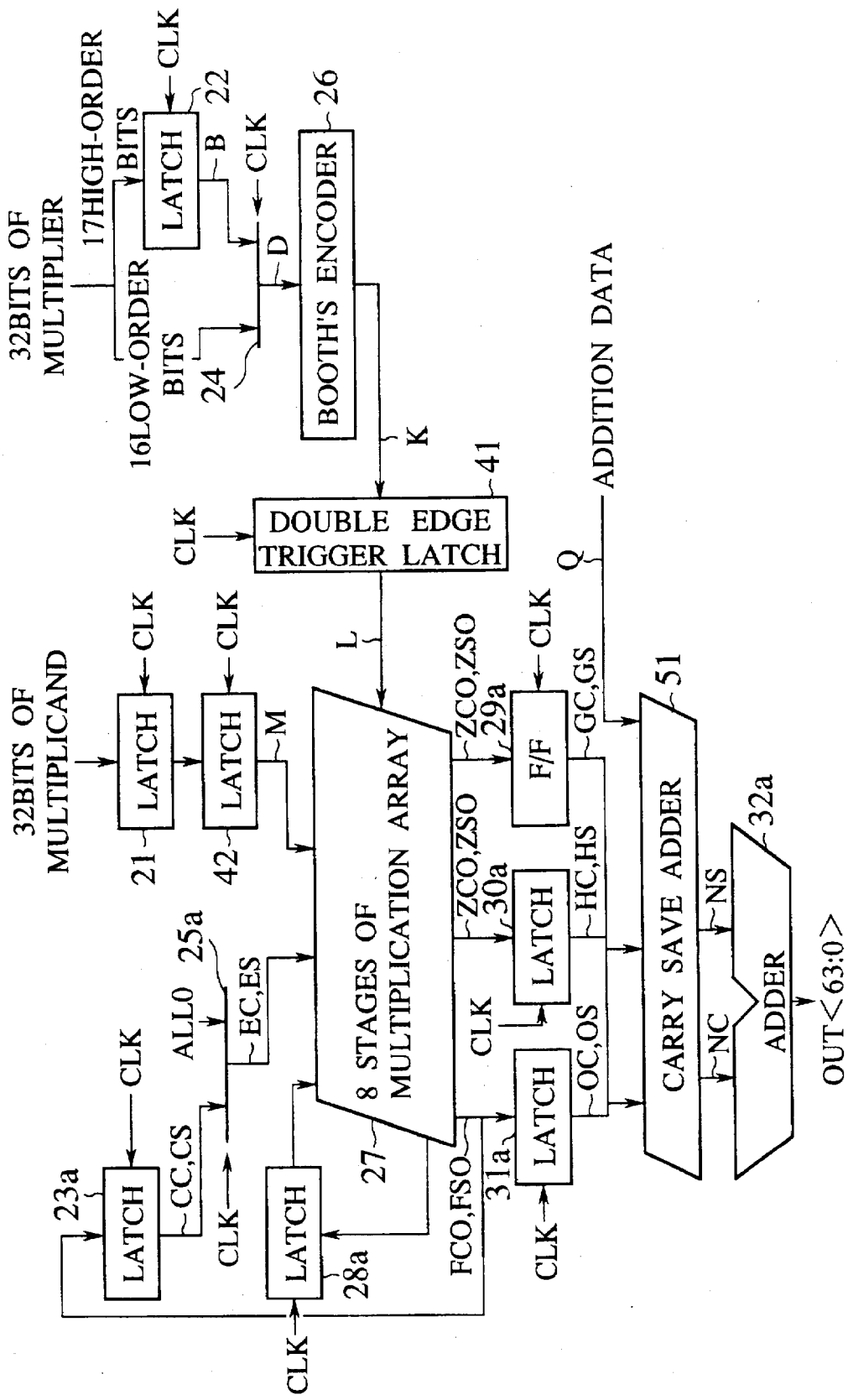
FIG. 17 is a view showing the entire arrangement of a sum of products calculation device according to the fourth embodiment of the present invention.

FIG. 17 is a view showing the entire arrangement of a sum of products calculation device according to the fourth embodiment of the present invention. The same reference numerals as in FIG. 13 denote the same parts in FIG. 17.

In this embodiment, on the basis of the multiplication device of the third embodiment, a sum of products calculation device capable of sum of products calculation (with sign) at a high speed of 32 bits×32 bits+64 bits is constituted. More specifically, in the multiplication device of the third embodiment shown in FIG. 13, a 64-bit carry save adder 51 is arranged on the output sides of the F/F 29a and the latch circuits 30a and 31a, and an adder 32a with CLA for performing addition for sum of products in a carry save form is arranged, as an adder connected to the output side of the carry save adder 51, in place of the adder 32 described above. The remaining arrangement is the same as that of the third embodiment.

In this case, in addition to an output from the F/F 29a and outputs from the latch circuits 30a and 31a, addition data Q<63:0> is supplied to the input terminal of the carry save adder 51. A carry signal NC<63:0> and an addition result NS<63:0> are output from the carry save adder 51 as output signals.

In the sum of products calculation device of this embodiment having the above arrangement, the same operations as the operations (A) to (C) in the first half 1 of the first clock to the first half 3 of the second clock in the multiplication device of the third embodiment are performed. However, the sum of products calculation device performs an operation different from the operation (D) in the second half 4 of the second clock in the multiplication device of the third embodiment.

More specifically, in the second half 4 of the second clock of this embodiment, the carry save adder 51 finally adds the outputs from the latch circuit 31a, the latch circuit 30a, and the register 29a, and, at the same time, the addition data Q<63:0> is added to the final addition result. That is, the carry save adder 51 has three input terminals, and {OC, HC, GC, 0}, {0, OS, HS, GS}, and the addition data Q<63:0> are supplied to the first, second, and third input terminals of the carry save adder 51, respectively.

The carry signal NC<63:0> and addition result NS<63:0> output from the carry save adder 51 are added to each other by the adder 32a with CAL as described below:

{NC<63:0>, 0}+{0, NS<63:0>} thereby obtaining an addition result OUT<63:0>.

When sum of products calculation is to be performed by using the multiplication device described in the third embodiment, after a multiplication result is obtained by the multiplication device shown in FIG. 13, addition must be performed. However, addition using the adder with CLA requires a long time. In consideration of this point, according to the fourth embodiment, a multiplication result in a carry save form and addition data are temporarily added to each other by the carry save adder 51, and the results are added to each other by the adder 32a with CAL. For this reason, an addition time in the sum of products calculation can be shortened. In this embodiment, although a circuit scale smaller than that of the prior art can be obtained, a calculation time is not prolonged.

Although the fourth embodiment describes that sum of products calculation is performed by using the multiplication device described in the third embodiment, sum of products calculation can also be performed by the multiplication device described in the first or second embodiment.

It should be understood that many modifications and adaptations of the invention will become apparent to those skilled in the art and it is intended to encompass such obvious modifications and changes in the scope of the claims appended hereto.

What is claimed is:

1. A multiplication device, comprising:

a multiplicand holding circuit for holding multiplicand data;

a multiplier holding circuit for holding predetermined number of bits from high-order bits of multiplier data;

a first selector for switching predetermined number of bits from low-order bits of multiplier data to an output from said multiplier holding circuit according to turning from the first or second half of a clock to the second or first half of the clock;

an intermediate result holding circuit for holding intermediate result data;

a second selector for switching an initial value to an output from said intermediate result holding circuit according to turning from the first or second half of the clock into the second or first half of the clock;

a plurality of partial product generation circuits for generating partial products on the basis of an output from said first selector and an output from said multiplicand holding circuit;

a plurality of accumulative addition circuits for performing accumulative addition on the basis of an output from said second selector or an output from a previous accumulative addition circuit and outputs from said partial product generation circuits to generate the intermediate result data serving as an intermediate result of multiplication;

an accumulative addition result holding circuit for holding an output from the predetermined number of said accumulative addition circuits and some of output from each of said accumulative addition circuits; and an output holding circuit for storing some of the output from each of said accumulative addition circuits, characterized in that, at a first timing which is the first or second half of the clock, said first selector selects predetermined number of bits from the low-order bits of the multiplier data, said second selector selects the initial valued, each partial product generation circuit generates partial products on the basis of one bit of an output from said first selector and an output from each bit of said multiplicand holding circuit, each accumulative addition circuit adds an output from said second selector or an output from a previous accumulative addition circuit to an output from said partial product generation circuit, writes an output from the predetermined number of said accumulative addition circuits in said intermediate result holding circuit as the intermediate result data, and writes the predetermined number of bits of the output from each accumulative addition circuit at a predetermined bit position of said output holding circuit;

at a second timing which is the second or first half of a clock after the clock switches, said first selector selects an output from said multiplier holding circuit, said second selector selects an output from said intermediate result holding circuit, each partial product generation circuit generates partial products on the basis of one bit of the output from said first selector and an output from each bit of said multiplicand holding circuit, each accumulative addition circuit adds an output from said second selector or an output from a previous accumulative addition circuit to an output from said partial product generation circuit, and writes the output from the predetermined number of said accumulative addition circuits and the predetermined number of bits of the output from each accumulative addition circuit in said accumulative addition result holding circuit.

2. A sum of products calculation device in which a carry propagation adder is connected to the output side of said accumulative addition result holding circuit in said multiplication device according to claim 1 through a carry save adder, characterized in that, at a third timing which is the first or second half of a clock and succeeds the second timing after the clock switches, an output from said accumulative addition result holding circuit and addition data are added to each other by said carry save adder, and the addition results in a carry save state are added to each other by said carry propagation adder to output a sum of products calculation result.

3. A multiplication device, comprising:

a multiplicand holding circuit for holding multiplicand data;

a multiplier holding circuit for holding a predetermined number of bits from high-order bits of multiplier data;

a first selector for switching a predetermined number of bits from low-order bits of multiplier data to an output from said multiplier holding circuit according to turning from the first or second half of a clock to the second or first half of the clock;

an encode circuit for encoding an output from said first selector;

an intermediate result holding circuit for holding intermediate result data;

a second selector for switching an initial value to an output from said intermediate result holding circuit according to turning from the first or second half of a clock to the second or first half of the clock;

a plurality of partial product generation circuits for generating partial products on the basis of an output from said encode circuit and an output from said multiplicand holding circuit;

a plurality of accumulative addition circuits for performing accumulative addition on the basis of an output from said second selector or an output from a previous accumulative addition circuit and outputs from said partial product generation circuits to generate the intermediate result data serving as an intermediate result of multiplication;

an accumulative addition result holding circuit for holding an output from the predetermined number of said accumulative addition circuits and some of output from each of said accumulative addition circuits; and an output holding circuit for storing some of the output from each of said accumulative addition circuits;

characterized in that, at a first timing which is the first or second half of the clock, said first selector selects a predetermined number of bits from the low-order bits of the multiplier data, said second selector selects the initial value, each partial product generation circuit generates partial products on the basis of an encode result of said encode circuit and an output from said multiplicand holding circuit, each accumulative addition circuit adds an output from said second selector or an output from a previous accumulative addition circuit to an output from said partial product generation circuit, writes an output from said predetermined number of accumulative addition circuits in said intermediate result holding circuit as the intermediate result data, and writes the predetermined number of bits of the output from each accumulative addition circuit at a predetermined bit position of said output holding circuit;

at a second timing which is the second or first half of a clock after the clock switches, said first selector selects an output from said multiplier holding circuit, said second selector selects an output from said intermediate result holding circuit, each partial product generation circuit generates partial products on the basis of an output from said encode circuit and an output from said multiplicand holding circuit, each accumulative addition circuit adds an output from said second selector or an output from a previous accumulative addition circuit to an output from said partial product generation circuit, and writes the output from the predetermined number of said accumulative addition circuits and the predetermined number of bits of the output from each accumulative addition circuit in said accumulative addition result holding circuit.

4. A multiplication device according to claim 3, characterized in that said encode circuit performs the encode on the basis of Booth's algorithm.

5. A multiplication device according to claim 4, characterized in that, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

6. A multiplication device according to claim 4, characterized by further comprising:

a sign holding circuit for holding a sign of a partial product in a predetermined stage;

in said first accumulative addition circuit, another full adder for sign extension and two selectors for selectively outputting an input signal depending on said first timing or the second timing to use two high-order bits of said accumulative addition circuit for sign extension, said two selectors corresponding to the two bits, respectively; and in said second accumulative addition circuit, two selectors for selectively outputting an input signal depending on the first timing or the second timing to the two high-order bits of said accumulative addition circuit for sign extension, said two selectors corresponding to the two bits, respectively.

7. A sum of products calculation device in which a carry propagation adder is connected to the output sides of said accumulative addition result holding circuit and said output holding circuit in said multiplication device according to claim 3 through a carry save adder, characterized in that, at a third timing which is the first or second half of a clock and succeeds the second timing after the clock switches, an output from said accumulative addition result holding circuit, an output from said output holding circuit, and addition data are added to each other by said carry save adder, and the addition results in a carry save state are added to each other by said carry propagation adder to output a sum of products calculation result.

8. A multiplication device according to claim 7, characterized in that said encode circuit performs the encode on the basis of Booth's algorithm.

9. A multiplication device according to claim 8, characterized in that, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

10. A multiplication device according to claim 8, characterized by further comprising:

a sign holding circuit for holding a sign of a partial product in a predetermined stage;

in said first accumulative addition circuit, another full adder for sign extension and two selectors for selectively outputting an input signal depending on said first timing or the second timing to use two high-order bits of said accumulative addition circuit for sign extension, said two selectors corresponding to the two bits, respectively; and in said second accumulative addition circuit, two selectors for selectively outputting an input signal depending on the first timing or the second timing to the two high-order bits of said accumulative addition circuit for sign extension, said two selectors corresponding to the two bits, respectively.

11. A multiplication device, comprising:

a multiplicand holding circuit for holding multiplicand data;

a multiplier holding circuit for holding a predetermined number of bits from high-order bits of multiplier data;

a first selector for switching a predetermined number of bits from low-order bits of multiplier data to an output from said multiplier holding circuit according to turning from the first or second half of a clock to the second or first half of the clock;

an encode circuit for encoding an output from said first selector;

an encode result holding circuit for holding an encode result from said encode circuit each time a logical value of the clock changes to output the encode result;

an intermediate result holding circuit for holding intermediate result data;

a second selector for switching an initial value to an output from said intermediate result holding circuit according to turning from the first or second half of the clock to the second or first half of the clock;

a plurality of partial product generation circuits for generating partial products on the basis of an output from said encode result holding circuit and an output from said multiplicand holding circuit;

a plurality of accumulative addition circuits for performing accumulative addition on the basis of an output from said second selector or an output from a previous accumulative addition circuit and outputs from said partial product generation circuits to generate the intermediate result data serving as an intermediate result of multiplication;

an accumulative addition result holding circuit for holding an output from the predetermined number of said accumulative addition circuits and some of outputs from said accumulative addition circuits; and an output holding circuit for storing some of the outputs from said accumulative addition circuits, characterized in that, at a first timing which is the first or second half of the clock, said first selector selects the predetermined number of bits from the low-order bits of the multiplier data, and said encode circuit encodes an output from said first selector to write the encode result in said encode result holding circuit, at a second timing which is the second or first half of a clock after the clock switches, said second selector selects the initial value, each partial product generation circuit generates partial products on the basis of an output from said encode result holding circuit and an output from said multiplicand holding circuit, each accumulative addition circuit adds an output from said second selector or an output from a previous accumulative addition circuit to an output from said partial product generation circuit, writes an output from the predetermined number of said accumulative addition circuit in said intermediate result holding circuit as the intermediate result data, and writes the predetermined number of bits of the output from each accumulative addition circuit at a predetermined bit position of said output holding circuit, said first selector selects an output from said multiplier holding circuit, and said encode circuit encodes an output from said first selector to write the encode result in said encode result holding circuit;

at a third timing which is the second or first half of a clock and succeeds the second timing after the clock switches, said second selector selects an output from said intermediate result holding circuit, each partial product generation circuit generates partial products on the basis of an output from said encode result holding circuit and an output from said multiplicand holding circuit, each accumulative addition circuit adds an output from said second selector or an output from a previous accumulative addition circuit to an output from said partial product generation circuit, and writes the output from the predetermined number of said accumulative addition circuit and the predetermined number of bits of the output from each accumulative addition circuit in said accumulative addition result holding circuit.

12. A multiplication device according to claim 11, characterized in that said encode circuit performs the encode on the basis of Booth's algorithm.

13. A multiplication device according to claim 12, characterized in that, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

14. A multiplication device according to claim 12, characterized by further comprising:

a sign holding circuit for holding a sign of a partial product in a predetermined stage;

in said first accumulative addition circuit, another full adder for sign extension and two selectors for selectively outputting an input signal depending on said second timing or the third timing to use two high-order bits of said accumulative addition circuit for sign extension, said two selectors corresponding to the two bits, respectively; and in said second accumulative addition circuit, two selectors for selectively outputting an input signal depending on the second timing or the third timing to the two high-order bits of said accumulative addition circuit for sign extension, said two selectors corresponding to the two bits, respectively.

15. A sum of products calculation device in which a carry propagation adder is connected to the output sides of said accumulative addition result holding circuit and said output holding circuit in said multiplication device according to claim 11 through a carry save adder, characterized in that, at a fourth timing which is the first or second half of a clock and succeeds the third timing after the clock stitches, an output from said accumulative addition result holding circuit, an output from said output holding circuit, and addition data are added to each other by said carry save adder, and the addition results in a carry save state are added to each other by said carry propagation adder to output a sum of products calculation result.

16. A multiplication device according to claim 15, characterized in that said encode circuit performs the encode on the basis of Booth's algorithm.

17. A multiplication device according to claim 16, characterized in that, each partial product generation circuit generates 0 times, 1 times, 2 times, −1 times−1, and −2 times−1 the multiplicand data, one of 0 times, 1 times, 2 times, −1 times−1, and −2 times−1 the multiplicand data is selected on the basis of select signals generated by performing the encode, each accumulative addition circuit adds 1 to the intermediate result data when −1 times−1 or −2 times−1 the multiplicand data is selected.

18. A multiplication device according to claim 16, characterized by further comprising:

a sign holding circuit for holding a sign of a partial product in a predetermined stage;

in said first accumulative addition circuit, another full adder for sign extension and two selectors for selectively outputting an input signal depending on said second timing or the third timing to use two high-order bits of said accumulative addition circuit for sign extension, said two selectors corresponding to the two bits, respectively; and in said second accumulative addition circuit, two selectors for selectively outputting an input signal depending on the second timing or the third timing to the two high-order bits of said accumulative addition circuit for sign extension, said two selectors corresponding to the two bits, respectively.

* * * * *